(12) United States Patent
Rochat et al.

(10) Patent No.: US 6,781,782 B2
(45) Date of Patent: Aug. 24, 2004

(54) METHOD AND APPARATUS FOR SAVING CALIBRATION PARAMETERS FOR A REMOVABLE CARTRIDGE

(75) Inventors: Daniel D. Rochat, Ogden, UT (US); Mark L. Reimann, Layton, UT (US); Allen T. Bracken, Layton, UT (US)

(73) Assignee: Iomega Corporation, Roy, UT (US)

( * ) Notice: Subject to any disclaimer, the term of this patent is extended or adjusted under 35 U.S.C. 154(b) by 584 days.

(21) Appl. No.: 09/746,304

(22) Filed: Dec. 21, 2000

(65) Prior Publication Data

US 2002/0118480 A1 Aug. 29, 2002

(51) Int. Cl.$^7$ .......................... G11B 21/02; G11B 19/02
(52) U.S. Cl. .......................... 360/75; 360/69
(58) Field of Search .............. 360/75, 69, 71, 360/31, 77.02, 77.04, 78.04; 711/115; 710/8, 13

(56) References Cited

U.S. PATENT DOCUMENTS

| | | | |
|---|---|---|---|
| 2,278,280 A | 3/1942 | Pfeiffer et al. | 439/248 |
| 2,896,833 A | 7/1959 | Markham | 206/454 |
| 3,144,236 A | 8/1964 | Clanin | 150/154 |
| 3,692,264 A | 9/1972 | Burkhard et al. | 248/621 |

(List continued on next page.)

FOREIGN PATENT DOCUMENTS

| | | |
|---|---|---|
| DE | 41 10 399 A1 | 10/1992 |
| DE | 43 04 506 | 8/1994 |
| EP | 0 204 299 | 12/1986 |
| EP | 0 210 497 | 2/1987 |
| EP | 0 335 490 | 10/1989 |
| EP | 0 426 414 | 5/1991 |
| FR | 2 691 435 | 11/1993 |
| GB | 2 228 819 | 9/1990 |
| GB | 2 243 940 | 11/1991 |
| JP | 62-259284 | 11/1987 |
| JP | 1-189091 | 7/1989 |
| JP | 06-236669 | 8/1994 |
| JP | 2000099217 | 7/2000 |
| WO | WO 93 24932 | 12/1993 |
| WO | WO99/06902 | 2/1999 |

OTHER PUBLICATIONS

Thomas A. Wilke, U.S. Ser. No. 09/590,508 filed Jun. 9, 2000.
Thomas A. Wilke, U.S. Ser. No. 09/591,081 filed Jun. 9, 2000.
Thomas A. Wilke, Allen T. Bracken, Ser. No. 09/591,354 filed Jun. 9, 2000.

(List continued on next page.)

*Primary Examiner*—Andrew L. Sniezek
(74) *Attorney, Agent, or Firm*—Haynes and Boone, LLP

(57) ABSTRACT

An information storage device (10, 510, 610, 710, 810) includes a cradle (12, 512, 612, 712, 812) which can removably receive a cartridge (11, 411, 511, 611, 711) that contains a rotatable hard disk (91, 326–327). A read/write head (107, 331–334) is supported for movement adjacent the disk by a pivotal actuator arm (101). The cradle controls alignment of the head with the disk using feedback servo tracking. Calibration parameters used to perform this tracking, such as servo information or read channel information, may be stored in a special track (414) which is on the disk, and which may be a read-only track. The special track stores a plurality of sets of calibration parameters, each corresponding to a respective combination of a cradle and an environmental characteristic such as temperature. The special track may also be used to store the number of times that the cartridge has been inserted into each of several different cradles, as well as a selected retry method which is more likely than other methods to be successful in recovering data that was subject to errors.

37 Claims, 10 Drawing Sheets

U.S. PATENT DOCUMENTS

| | | |
|---|---|---|
| 3,695,421 A | 10/1972 | Wood .......................... 206/523 |
| 4,061,228 A | 12/1977 | Johnson ...................... 206/454 |
| 4,062,049 A | 12/1977 | Dirks ....................... 360/78.12 |
| 4,359,762 A | 11/1982 | Stollorz .................... 360/98.07 |
| 4,414,576 A | 11/1983 | Randmae .................... 348/373 |
| 4,507,689 A | 3/1985 | Kozuki ....................... 386/108 |
| 4,527,262 A | 7/1985 | Manto ..................... 369/30.43 |
| 4,550,343 A | 10/1985 | Nakatani .................... 348/375 |
| 4,562,500 A | 12/1985 | Bygdnes .................. 360/256.6 |
| 4,622,607 A | 11/1986 | Smith, II ................. 360/99.12 |
| 4,639,863 A | 1/1987 | Harrison .................. 360/97.01 |
| 4,683,520 A | 7/1987 | Grassens et al. ............ 361/427 |
| 4,688,206 A | 8/1987 | Nakagawa et al. ......... 369/291 |
| 4,705,257 A | 11/1987 | Leo et al. ................... 248/611 |
| 4,709,817 A | 12/1987 | Keady ........................ 206/523 |
| 4,712,146 A | 12/1987 | Moon ..................... 360/97.03 |
| 4,724,500 A | 2/1988 | Dalziel ................... 360/245.7 |
| 4,749,164 A | 6/1988 | Leo et al. ................... 248/674 |
| 4,754,397 A | 6/1988 | Varaiya et al. ............. 361/685 |
| 4,763,225 A | 8/1988 | Frenkel et al. ............. 361/709 |
| 4,769,764 A | 9/1988 | Levanon ..................... 361/680 |
| 4,791,511 A | 12/1988 | Davis ......................... 369/291 |
| 4,806,106 A | 2/1989 | Mebane ......................... 439/77 |
| 4,833,554 A | 5/1989 | Dalziel et al. ........... 360/98.04 |
| 4,853,807 A | 8/1989 | Trager ..................... 360/97.01 |
| 4,856,656 A | 8/1989 | Sugimoto et al. ........... 206/523 |
| 4,869,369 A | 9/1989 | Turngren .................... 206/523 |
| 4,884,261 A | 11/1989 | Dalziel ..................... 360/255.2 |
| 4,893,210 A | 1/1990 | Mintzlaff .................... 360/137 |
| 4,893,263 A | 1/1990 | Myers ....................... 361/684 |
| 4,896,777 A | 1/1990 | Lewis ......................... 211/41 |
| 4,908,715 A | 3/1990 | Krum ...................... 360/97.07 |
| 4,926,291 A | 5/1990 | Sarraf ........................ 361/685 |
| 4,937,806 A | 6/1990 | Babson et al. ............. 369/75.1 |
| 4,965,691 A | 10/1990 | Iftikar et al. ................ 360/133 |
| 4,974,103 A | 11/1990 | Iftikar et al. ............. 360/97.01 |
| 5,002,368 A | 3/1991 | Anglin ...................... 350/334 |
| 5,004,207 A | 4/1991 | Ishikawa et al. ............ 248/632 |
| 5,024,328 A | 6/1991 | Bontrager .................. 206/453 |
| 5,025,335 A | 6/1991 | Stefansky ................ 360/97.01 |
| 5,041,924 A | 8/1991 | Blackborow et al. ......... 360/69 |
| 5,065,262 A | 11/1991 | Blackborow ................. 360/75 |
| 5,084,791 A | 1/1992 | Thanos .................... 360/77.04 |
| 5,126,890 A | 6/1992 | Wade et al. .................. 360/66 |
| 5,128,830 A | 7/1992 | Deluca et al. .............. 361/383 |
| 5,160,473 A | 11/1992 | Bontrager .................. 264/138 |
| 5,170,300 A | 12/1992 | Stefansky ................ 360/256.2 |
| 5,175,657 A | 12/1992 | Iftikar et al. ............. 360/98.01 |
| 5,204,794 A | 4/1993 | Yoshida ...................... 360/133 |
| 5,207,327 A | 5/1993 | Brondos ..................... 206/523 |
| 5,208,712 A | 5/1993 | Hatch et al. ............. 360/98.01 |
| 5,214,550 A | 5/1993 | Chan ....................... 360/97.01 |
| 5,223,996 A | 6/1993 | Read et al. ............... 360/17.02 |
| 5,235,481 A | 8/1993 | Kamo et al. .............. 360/97.01 |
| 5,241,436 A | 8/1993 | Kawabata ................ 360/97.01 |
| 5,243,485 A | 9/1993 | Weiley ....................... 360/132 |
| H1245 H | 10/1993 | Griswold et al. |
| 5,253,129 A | 10/1993 | Blackborow et al. ......... 360/69 |
| 5,258,888 A | 11/1993 | Korinsky .................... 361/704 |
| 5,303,101 A | 4/1994 | Hatch et al. ................ 360/256 |
| 5,317,464 A | 5/1994 | Witt et al. ............... 360/99.08 |
| 5,359,504 A | 10/1994 | Ohmi et al. ................ 360/137 |
| 5,363,227 A | 11/1994 | Ichikawa et al. ............. 359/83 |
| 5,363,276 A | 11/1994 | Crockett .................... 361/752 |
| 5,372,515 A | 12/1994 | Miller et al. ................ 439/138 |
| 5,392,197 A | 2/1995 | Cuntz et al. ................ 361/818 |
| 5,400,196 A | 3/1995 | Moser et al. ............ 360/97.02 |
| 5,400,389 A | 3/1995 | Niiyama et al. .............. 379/58 |
| 5,402,308 A | 3/1995 | Koyanagi et al. ........... 361/685 |
| 5,408,383 A | 4/1995 | Nagasaka et al. ........... 361/707 |
| 5,412,522 A | 5/1995 | Lockhart et al. .......... 360/97.01 |
| 5,426,562 A | 6/1995 | Morehouse et al. ........ 361/685 |
| 5,436,857 A | 7/1995 | Nelson et al. ........... 364/708.1 |
| 5,438,162 A | 8/1995 | Thompson et al. ......... 174/52.2 |
| 5,444,586 A | 8/1995 | Iftikar et al. .............. 360/99.12 |
| 5,448,433 A | 9/1995 | Morehouse .............. 360/97.02 |
| 5,452,159 A | 9/1995 | Stefansky ................. 360/256.2 |
| 5,454,080 A | 9/1995 | Fasig et al. .................. 710/302 |
| 5,463,527 A | 10/1995 | Hager et al. ................ 361/685 |
| 5,477,401 A | 12/1995 | Squires et al. ................ 360/75 |
| 5,479,285 A | 12/1995 | Burke .......................... 359/83 |
| 5,502,604 A | 3/1996 | Furay ...................... 360/97.01 |
| 5,532,889 A | 7/1996 | Stefansky et al. ........ 360/97.01 |
| 5,532,891 A | 7/1996 | Tsujino ........................ 360/106 |
| 5,550,712 A | 8/1996 | Crockett .................... 361/752 |
| 5,585,986 A | 12/1996 | Parkin ........................ 360/113 |
| 5,615,070 A | 3/1997 | Bordes ....................... 360/133 |
| 5,631,788 A | 5/1997 | Richards .................. 360/264.2 |
| 5,644,454 A | 7/1997 | Arya et al. .................. 360/106 |
| 5,663,855 A | 9/1997 | Kim et al. ................ 360/256.2 |
| 5,715,169 A | 2/1998 | Noguchi ................. 364/474.07 |
| 5,724,216 A | 3/1998 | Iftikar et al. ................. 360/133 |
| 5,727,170 A | 3/1998 | Mitchell et al. ............. 710/105 |
| 5,734,860 A | 3/1998 | Kondo ........................ 711/115 |
| 5,739,995 A | 4/1998 | Ohmi et al. .................. 360/75 |
| 5,754,357 A | 5/1998 | Anderson et al. ............ 360/137 |
| 5,793,207 A | 8/1998 | Gill ............................ 324/252 |
| 5,808,830 A | 9/1998 | Stefansky ................ 360/97.01 |
| 5,808,866 A | 9/1998 | Porter ......................... 361/695 |
| 5,809,520 A | 9/1998 | Edwards et al. ............ 711/105 |
| 5,812,373 A | 9/1998 | Hwang ....................... 361/704 |
| 5,818,029 A | 10/1998 | Thomson .................... 235/486 |
| 5,831,788 A | 11/1998 | Hofland ................... 360/97.01 |
| 5,837,934 A | 11/1998 | Valavanis et al. .......... 174/52.1 |
| 5,841,605 A | 11/1998 | Foster et al. ........... 360/997.01 |
| 5,872,669 A | 2/1999 | Morehouse et al. .......... 360/69 |
| 5,928,347 A | 7/1999 | Jones ......................... 710/129 |
| 5,943,193 A | 8/1999 | Thayne et al. ............ 360/255.5 |
| 5,943,208 A | 8/1999 | Kato et al. .................. 361/685 |
| 5,949,630 A | 9/1999 | Yamamoto et al. ......... 360/133 |
| 5,969,901 A | 10/1999 | Eckberg et al. ........... 360/97.01 |
| 5,986,991 A | 11/1999 | Kawahara et al. ......... 369/75.1 |
| 5,995,365 A | 11/1999 | Broder et al. ............... 361/685 |
| 5,999,406 A | 12/1999 | McKain et al. ............. 361/704 |
| 6,021,029 A | 2/2000 | Mamiya et al. ............. 360/133 |
| 6,025,973 A | 2/2000 | Mizoshita et al. ....... 360/98.08 |
| 6,028,744 A | 2/2000 | Amirkiai et al. ......... 360/256.2 |
| 6,082,543 A | 7/2000 | Béliveau ..................... 206/523 |
| 6,088,312 A | 7/2000 | Utsumi ........................ 369/87 |
| 6,128,670 A | 10/2000 | Hashimoto et al. ............ 710/1 |
| 6,144,552 A | 11/2000 | Whitcher et al. ............ 361/681 |
| 6,154,330 A | 11/2000 | Nakagawa ................... 360/48 |
| 6,154,360 A | 11/2000 | Kaczeus, Sr. et al. ...... 361/685 |
| 6,166,901 A | 12/2000 | Gamble et al. ............. 361/685 |
| 6,185,069 B1 | 2/2001 | Schick ........................ 360/133 |
| 6,201,771 B1 | 3/2001 | Otsuka et al. ................ 369/30 |
| 6,230,074 B1 | 5/2001 | Shinkai ....................... 700/214 |
| 6,252,744 B1 | 6/2001 | Kelemen .................. 360/256.2 |
| 6,259,573 B1 | 7/2001 | Tsuwako et al. ............. 360/46 |
| 6,266,724 B1 | 7/2001 | Harari et al. ................ 710/102 |
| 6,285,092 B1 | 9/2001 | Kawahara et al. ............ 307/85 |
| 6,298,016 B1 | 10/2001 | Otsuka ......................... 369/14 |
| 6,301,087 B1 | 10/2001 | Combe ................... 360/122 X |
| 6,304,440 B1 | 10/2001 | Lin ............................. 361/685 |
| 6,320,744 B1 | 11/2001 | Sullivan et al. ............. 361/685 |
| 6,324,054 B1 | 11/2001 | Chee et al. ................. 361/685 |
| 6,353,870 B1 | 3/2002 | Mills et al. .................. 710/301 |
| 6,374,315 B1 | 4/2002 | Okada et al. ................. 710/62 |
| 6,386,979 B1 | 5/2002 | Ho et al. ...................... 463/43 |
| 6,388,591 B1 | 5/2002 | Ng ............................. 341/100 |
| 6,496,979 B1 | 12/2002 | Chen et al. .................. 395/712 |

| | | |
|---|---|---|
| 6,501,612 B1 | 12/2002 | Kato et al. .................... 360/69 |
| 6,510,485 B1 | 1/2003 | Shin ........................... 710/315 |
| 6,564,290 B1 | 5/2003 | Lechner ...................... 711/111 |
| 6,566,838 B2 | 5/2003 | Maiocchi ..................... 318/652 |
| 6,570,728 B2 | 5/2003 | Iizuka et al. ................. 360/69 |
| 6,574,058 B1 | 6/2003 | Aruga et al. .................. 360/2 |
| 6,587,300 B1 * | 7/2003 | Dobbek ....................... 360/75 |
| 2002/0042152 A1 | 4/2002 | Yamazaki et al. ............. 438/4 |
| 2002/0044416 A1 | 4/2002 | Harmon, III et al. ....... 361/685 |

OTHER PUBLICATIONS

Thomas A. Wilke, Allen T. Bracken, Brent J. Watson, Fred C. Thomas III, U.S. Ser. No. 09/591,074 filed Jun. 9, 2000.

Thomas A. Wilke, Marvin R. DeForest, Dennis D. Ogden, Ser. No. 09/591,540 filed Jun. 9, 2000.

Allen T. Bracken, Mark L. Reimann, Theodore J. Smith, U.S. Ser. No. 09/591,538 filed Jun. 9, 2000.

Jeffery D. Penman, Todd R. Shelton, U.S. Ser. No. 09/590,509 filed Jun. 9, 2000.

Randall C. Bauck, U.S. Ser. No. 09/590,498, filed Jun. 9, 2000.

Randall C. Bauck, Allen T. Bracken, Thomas A. Wilke, David S. Greenhalgh, U.S. Ser. No. 09/590,511 filed Jun. 9, 2000.

Allen T. Bracken, Theodore J. Smith, Jeffery D. Penman, Todd R. Shelton, David S. Greenhalgh; Paul E. Jacobs, Spencer W. Stout, Paul C. Kunz, Scott P. Thomas, Douglas S. Reynolds, David L. Jolley. Ryan D. Osterhout, U.S. Ser. No. 09/755,961 filed Jan. 4, 2001.

Paul C. Kunz, U.S. Ser. No. 09/854,354, filed May 11, 2001.

Paul C. Kunz, Ryan D. Osterhout, Theodore J. Smith, Spencer W. Stout, Scott P. Thomas, U.S. Ser. No. 09/854,391 filed May 11, 2000.

Fred C. Thomas, III, U.S. Ser. No. 09/839,515, filed Apr. 20, 2001.

Ryan D. Osterhout, Scott P. Thomas, Paul C. Kunz, Allen T. Bracken, U.S. Ser. No. 09/858,073, filed May 14, 2001.

Todd R. Shelton, Theodore J. Smith, Marvin R. DeForest, Kelly D. Wright, Mark L. Reimann, Hiromichi (nmi) Oribe, Jeffery D. Penman, U.S. Ser. No. 09/855,993, filed May 14, 2001.

William P. Baker, Todd R. Shelton, Theodore J. Smith, U.S. Ser. No. 09/866,568 filed May 25, 2001.

"IBM Travelstar E—External Hard Disk Drive—Installation and Operation Guide", IBM Storage Systems Division, San Jose, California, 2000, 10 sheets.

* cited by examiner

METHOD AND APPARATUS FOR SAVING CALIBRATION PARAMETERS FOR A REMOVABLE CARTRIDGE

CROSS-REFERENCE TO RELATED APPLICATION

The subject matter of this application is related to the subject matter of U.S. Ser. No. 09/590,511, filed Jun. 9, 2000 and entitled "Method and Apparatus for Making a Drive Compatible with a Removable Cartridge" (attorney reference 067470.0116/P0630).

TECHNICAL FIELD OF THE INVENTION

The present invention relates in general to an information storage device having an information storage medium disposed in a removable cartridge and, more particularly, to a method and apparatus for storing calibration parameters used by the cartridge on the storage medium within the cartridge.

BACKGROUND OF THE INVENTION

Over the past twenty years, computer technology has evolved very rapidly. One aspect of this evolution has been a progressively growing demand for increased storage capacity in memory devices, especially where the information storage medium is disposed in some form of removable cartridge. In this regard, just a little over a decade ago, the typical personal computer had a floppy disk drive which accepted floppy disk cartridges that contained 5.251" disks having a storage capacity up to about 720 KB per cartridge. Not long thereafter, these devices gave way to a new generation of floppy disk drives which accepted smaller floppy disk cartridges that contained 3.5" disks having higher storage capacities, up to about 1.44 MB per cartridge.

Subsequently, as the evolution continued, a further significant increase in storage capacity was realized in the industry by the introduction of a storage system having removable cartridges containing floppy-type disks with storage capacities on the order of 100 MB to 250 MB. Systems of this are commercially available under the tradename ZIP from Iomega Corporation of Roy, Utah, which is the Assignee of the present application. Thereafter, another significant increase in storage capacity was realized by the introduction of a system having removable cartridges with storage capacities on the order of 1 GB to 2 GB. Systems of this type are also available from Iomega Corporation, under the tradename JAZ. The cartridges used in this system had a hard disk in an unsealed housing, with the read/write head in the drive. These two products have each enjoyed immense commercial success. Nevertheless, the demand for still greater storage capacities in removable cartridges continues to progressively increase, such there is a current need for cartridges capable of storing 5 GB to 20 GB, or even more.

The types of removable cartridges discussed above each contain a rotatably supported storage medium within an unsealed housing. The read/write heads, with associated circuitry and support structure, are in the drive rather than in the cartridge. Significantly higher storage capacities exist in hard disk technology of the type used in non-removable hard disk drives, where the disk and head are both within a sealed housing. However, there are problems involved in attempting to carry use of this technology over to removable cartridges. This is due in part to the fact that a high-capacity hard disk is highly sensitive to environmental factors such as dust and static electricity. Consequently, in order to achieve high storage densities, the sealed housing is needed for the hard disk itself, as well as for some associated components, such as the read/write heads, which must be within the sealed housing and thus within the cartridge. Although some prior attempts have been made to use hard disk technology within a sealed housing in a removable cartridge, these attempts never resulted in a product which has had any significant level of commercial success. Instead, the types of cartridges discussed above continue to dominate the market.

Where a sealed housing has been used, the most typical prior approach was to incorporate the entire structure of a hard disk drive unit into the cartridge, such that the cartridge was not significantly different from a self-contained, standalone hard disk drive unit. In a sense, this was not a true cartridge at all, but simply a complete and self-contained hard disk drive which could be removed more easily than most from the system in which it was installed. One example of such a device is a system which was commercially available as the model P3250AR removable hard disk drive from Kalok Corporation of Sunnyvale, Calif. Another example of such a system is disclosed in Blackborow et al. U.S. Pat. No. 5,041,924. Since each cartridge in this type of system is effectively a standalone, self-contained disk drive, each cartridge is relatively heavy and expensive.

A different prior approach was to split the components of a self-contained hard disk drive into two groups, and to include one group within a sealed housing in each removable cartridge, and the other group in a drive which can removably receive one of the cartridges. Examples of this approach appear in Stollorz U.S. Pat. No. 4,359,762, Iftikar et al. U.S. Pat. No. 4,965,691, Chan U.S. Pat. No. 5,214,550, Kamo et al. U.S. Pat. No. 5,235,481, Witt et al. U.S. Pat. No. 5,317,464, and Lockhart et al. U.S. Pat. No. 5,412,522. While pre-existing products using this approach were adequate for their intended purposes, they were not satisfactory in all respects, and none of them experienced any significant commercial success.

In this regard, one consideration is that, where circuitry in a drive effects alignment of a read/write head with a disk using feedback servo control, the drive must be aware of certain servo parameters which define appropriate control characteristics suitable for use with that particular type of hard disk. Where a given drive is to be used with various different types of cartridges, the appropriate servo parameters may vary from one cartridge type to another. Moreover, even for a particular type of cartridge, appropriate servo parameters may vary somewhat from cartridge to cartridge, especially where optimum accuracy is desirable. Consequently, one existing approach is to have the drive carry out a calibration procedure each time a cartridge is inserted. However, the time required to carry out such a calibration procedure can be sufficiently long that it is perceptible to a human operator. Further, as storage densities increase, and in situations where a drive is to be used with different types of cartridges, the number and/or complexity of the calibrations carried out in the calibration procedure increase, thereby increasing the initial start up time. A further factor that can come into play involves environmental conditions such as temperature, because the calibration parameters that may be optimum for one temperature range may not be the calibration parameters that are optimum for a different temperature range.

Yet another consideration is the fact that, if an error is detected, a procedure commonly known as a retry method is typically carried out in an attempt to recover the data which was subject to the error. A number of different retry methods are known in the art, and it is common to successively try various different retry methods until one of them is successful. However, each of these retry methods takes a finite amount of time. Where a number of different retry methods are tried in succession before a successful method is found, there can be a delay which is perceptible to and which can annoy a human operator.

Still another consideration is that, when a problem is encountered with a cartridge, the cartridge may be returned to the manufacturer. In order to efficiently determine the problem, so as to facilitate repair of the cartridge or permit alteration of the cartridge design in order to avoid similar future problems, it would be helpful to the manufacturer to have some historical information about the use of the cartridge. As one example, it would be helpful to the manufacturer to know whether the cartridge failed early in its expected operational lifetime, or toward the end of its operational lifetime following numerous insertions into a number of different drives.

SUMMARY OF THE INVENTION

From the foregoing, it will be appreciated that a need has arisen for a method and apparatus for operating an information storage cartridge which includes a port and an information storage medium having an information storage surface, so as to efficiently determine suitable calibration parameters for use of the cartridge with each of various different receiving units, including storage of the calibration parameters on the storage medium.

According to one form of the present invention, a method and apparatus are provided to address this need, and involve: storing on the storage surface information which includes control information, the control information including a plurality of control parameter sets which each correspond to a respective receiving unit into which the cartridge can be removably inserted; supporting the storage medium and a head for relative movement in a manner causing the head to move relative to the surface while remaining adjacent thereto; transferring information between the port and the storage medium, including use of the head to effect at least one of reading information from and writing information to the storage medium; reading the control information from the information storage surface using the head; selecting from the control information one of the control parameter sets which corresponds to a respective receiving unit into which the cartridge is currently inserted; and thereafter effecting the relative movement of the head and the storage medium as a function of the selected control parameter set.

BRIEF DESCRIPTION OF THE DRAWINGS

A better understanding of the present invention will be realized from the detailed description which follows, taken in conjunction with the accompanying drawings, in which.

DETAILED DESCRIPTION OF THE INVENTION

Figure 1:
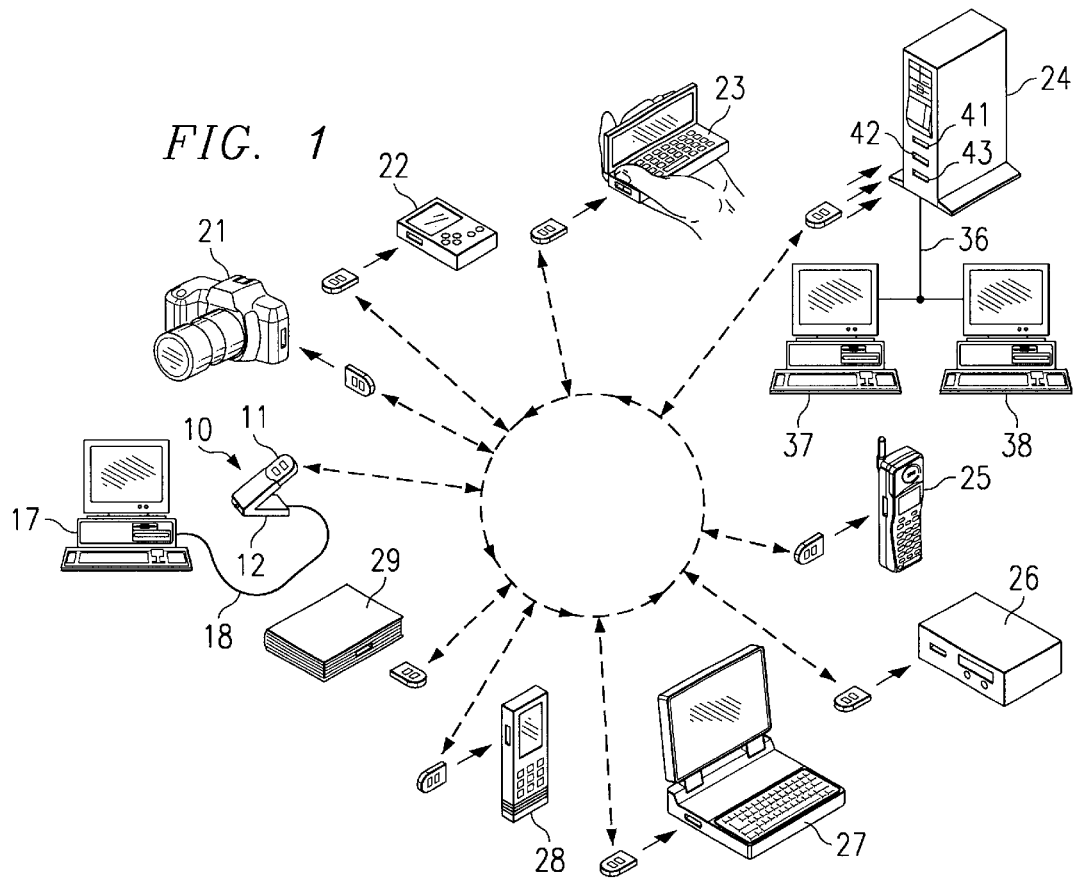
FIG. 1 is a diagrammatic view showing an information storage device according to the present invention which includes a cartridge and is coupled to a host computer system, and also showing a plurality of other types of devices into which a cartridge from the information storage device can be removably inserted.

FIG. 1 is a diagrammatic view showing an information storage device 10 which embodies the present invention, which includes an information storage cartridge 11 removably inserted into a receiving unit or cradle 12, and which is coupled by a cable 18 to a host computer system 17. FIG. 1 also shows a variety of other devices 21–29 into which the cartridge 11 can be removably inserted. Each of the devices 21–29 has, as an integral part thereof, structure which corresponds functionally to the cradle 12.

In FIG. 1, the devices 21–29 are shown only by way of example, to give a sense of the wide variety of types of devices with which the cartridge could be used. In this regard, the device 21 is a digital camera, the device 22 is a portable game device, and the device 23 is a handheld computer. The device 23 might alternatively be a unit of the type commonly known as a personal digital assistant (PDA). The device 24 is a server which is coupled by a home computer network 36 to several home computers, two of which are shown at 37 and 38. It will be noted that the server 24 has three slots or receiving units 41–43, which can each removably receive a respective different cartridge of the type indicated at 11. The server does not need to have more than one of the receiving units 41–43, but three units are shown in FIG. 1 in order to emphasize that use of more than one can be advantageous.

The device 25 is a cellular telephone, and the device 26 is a video recording unit which is capable of reading digital video information from the cartridge 11, and/or storing digital video information on the cartridge 11. The device 26 may, for example, be a video recording device similar to the device which is commercially available under the tradename TiVo. The device 27 is a portable "notebook" computer, and the device 28 is a global positioning satellite (GPS) device. The device 28 is responsive to radio signals from not-illustrated satellites for using known techniques to make a precise determination of the current location of the device 28 on the surface of the earth. The cartridge 11 may contain map information for the region in which the GPS device 28 is currently located, so that the device 28 can display a map on its liquid crystal display (LCD) screen, and then indicate on that map the current location of the device 28. The device 29 is an electronic book.

As mentioned above, the various devices 21–29 shown in FIG. 1 are merely exemplary, and it will be recognized that the cartridge 11 could also be used with other types of devices, including variations and modifications of the specific devices shown in FIG. 1. For example, it would be possible for the cartridge 11 to be removably inserted into a compact disk player, a music synthesizer, or an Internet access device designed for use with a television, such as a device of the type commercially available under the tradename WebTV. It will also be recognized from FIG. 1 that the digital information stored in the cartridge 11 can represent a variety of different things, including but not limited to data, photographs, video images, sounds such as music, and so forth.

Figure 2:
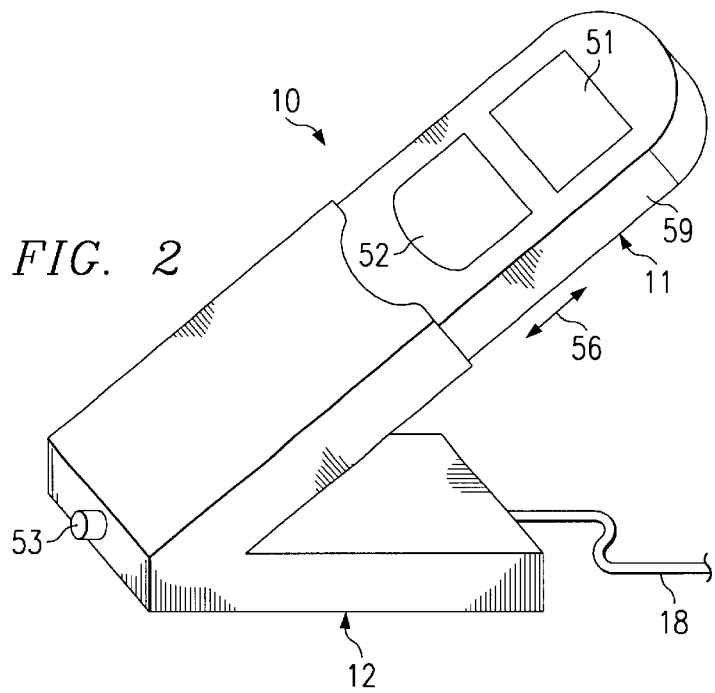
FIG. 2 is a diagrammatic perspective view of the information storage device of FIG. 1.

FIG. 2 is an enlarged perspective view of the information storage device 10 of FIG. 1. The overall appearance of the device 10 in FIG. 2 represents one possible appearance. It will be recognized that the external appearance of the device could take a variety of other forms without departing from the scope of the present invention. In FIG. 2, the cartridge 11 is shown with two labels 51 and 52, one of which may contain user-supplied information regarding the type of information which is currently stored in the cartridge 11. The other label may provide information which is not subject to change, such as the name of the manufacturer, the capacity of the cartridge, and so forth.

According to a feature of the present invention, the cradle 12 is capable of working with several different versions of the cartridge 11. For example, there might be four versions of the cartridge 11 which have respective storage capacities of 5 GB, 10 GB, 15 GB and 20 GB. Further, there may be different versions of the cartridge 11 which have the same storage capacity. For example, one version of a 10 GB cartridge may have certain moving parts supported by high-quality bearings, whereas another version of the 10 GB cartridge may have equivalent moving parts which are supported by less expensive bushings. The latter version would thus be less expensive, but would also have a shorter expected operational lifetime.

As discussed in more detail later, when the cartridge 11 has been inserted into the cradle 12, it is releasably latched in the cradle 12 in order to preclude its inadvertent withdrawal while the device 10 is in use. The cradle 12 has a release button 53 which, as discussed later, causes the device 10 to bring to a conclusion any operations which may be in progress, and to then release the cartridge 11 for withdrawal. The cartridge 11 is inserted into and removed from the cradle 12 in directions which are indicated in FIG. 2 by the double-headed arrow 56. In the disclosed embodiment, the cartridge 11 contains a hard disk which is not visible in FIG. 2, but which is illustrated and described in more detail later. Due to the fact that a hard disk and the associated read/write heads are highly sensitive to factors such as dust and static, the cartridge 11 has a sealed housing 59. The information storage device 10 of FIG. 2 will now be described in more detail with reference to FIG. 3.

Figure 3:
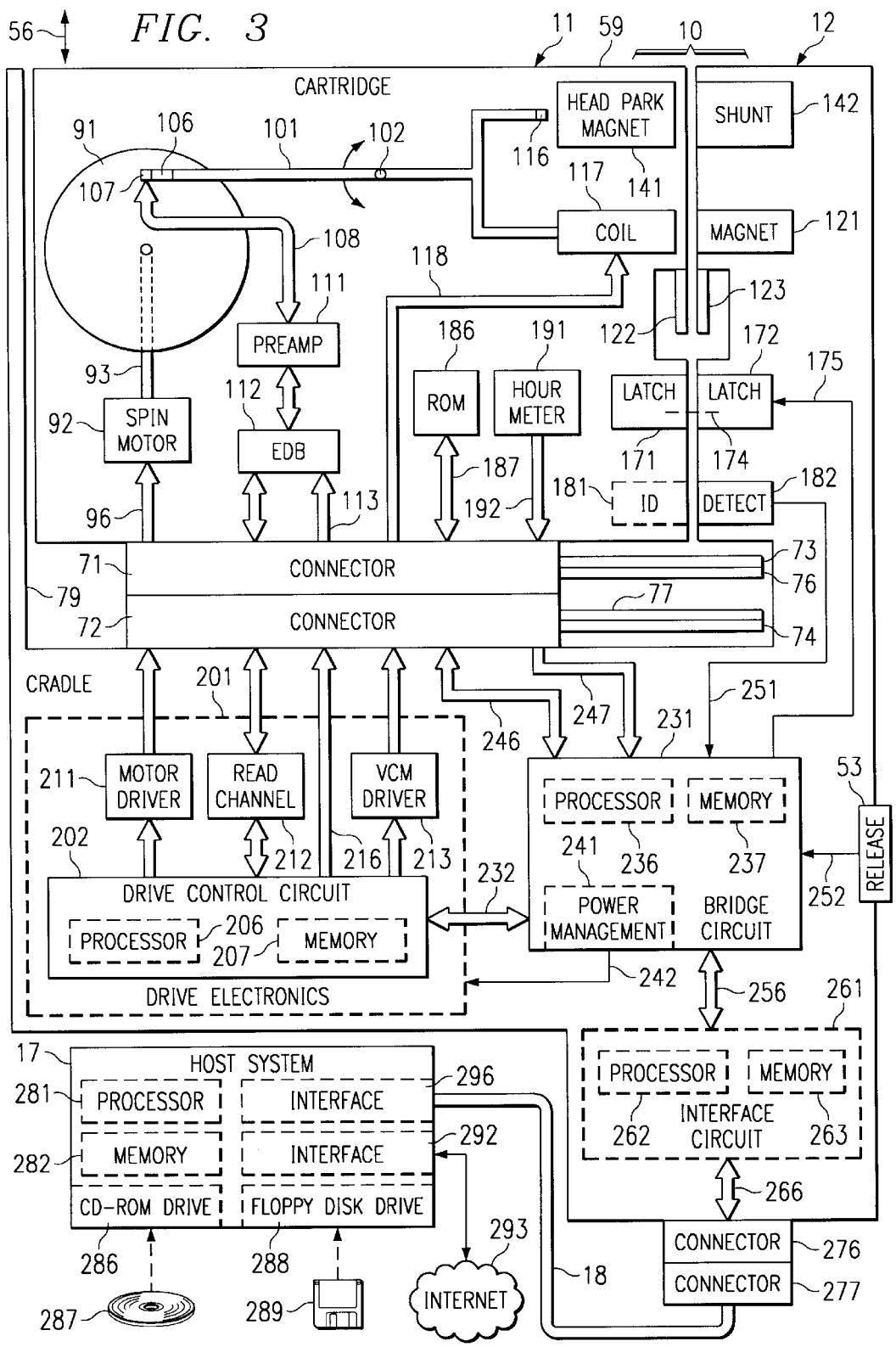
FIG. 3 is a diagrammatic view showing internal structure of the information storage device and host system of FIG. 1.

More specifically, FIG. 3 is a diagrammatic view of the information storage device 10 and the host computer system 17 of FIG. 1, and diagrammatically depicts various components which make up each of the cartridge 11, cradle 12 and host system 17. The cartridge 11 includes a connector 12 which matingly engages al connector 72 of the cradle 12 when the cartridge is inserted in the cradle, the connectors 71 and 72 serving as communication ports that allow the cartridge and cradle to exchange electrical signals.

Associated with each of the connectors 71 and 72 is a respective cover 73 or 74. Each cover has on one side thereof a respective optional conductive layer 76 or 77. When the cartridge 11 is removably received within the cradle 12, the covers 73 and 74 are in open positions shown in FIG. 3, in which the pins of the connectors 71 and 72 are exposed, so that the connectors can mate. On the other hand, when the cartridge 11 has been withdrawn from the cradle 12, the covers 73 and 74 are each in a position in which they cover the pins of the associated connector, with the conductive layers 76 and 77 engaging the outer ends of the pins, in order to prevent the buildup of electrostatic potential in the circuitry or wiring of either the cartridge 11 or the cradle 12.

The covers 73 and 74 may each be moved manually between their open and closed positions. Alternatively, a mechanism may be provided to automatically move one or both of the covers 73 and 74 between their open and closed positions as the cartridge 11 is inserted or withdrawn, for example in a manner analogous to the manner in which the cover on a standard 3.5" floppy disk is automatically opened and closed as the floppy disk is inserted into and removed from a standard floppy disk drive.

In order to ensure a proper mating of the connectors 71 and 72 as the cartridge 11 is inserted into the cradle 12, the cartridge must be in accurate alignment with respect to the cradle 12 as its insertion movement reaches completion. In the disclosed embodiment, a recess 79 is provided in the cradle 12 and receives at least a portion of the cartridge 11, so as to ensure that the cartridge 11 and cradle 12 are very accurately aligned as the connectors 71 and 72 approach each other. In addition to the recess 79, or in place thereof, there may be physical guide structure which is not illustrated in FIG. 3, such as cooperating guide slots and guide projections on the cartridge 11 and cradle 12.

Within the housing 59 of the cartridge 11, a hard disk 91 is mounted on a spindle 93, which can be rotatably driven by a spin motor 92. The disk 91 and spindle 93 together form a disk assembly. The spin motor 92 is controlled by electrical signals received at 96 through the connector 71. The hard disk 91 has a substrate made of a known material such as aluminum, glass, plastic, or embossed plastic. On the side of the disk 91 which is visible in FIG. 3, the disk 91 has a layer of a known magnetic material, where digital information can be magnetically stored. An actuator arm 101 is supported for pivotal movement on the housing 59 by a bearing or bushing at 102. At one end, the actuator arm has a suspension 106 which supports a read/write head 107, so that the head is closely adjacent the surface of the disk 91. The suspension 106 is of a known type, and is therefore not described here in detail. In the disclosed embodiment, the head 107 is of a known type, such as an inductive head, a magnetoresistive (MR) head, or a giant magnetoresistive (GMR) head.

For convenience and clarity in describing the present invention, the cartridge 11 in the embodiment of FIG. 3 is described as having only a single hard disk 91 with a magnetic surface on only one side thereof, and as having only a single read/write head 107. However, those skilled in the art will recognize that it would be possible to also use the opposite side of the disk 91, in which case a second head would be provided. Further, it would be possible to provide one or more additional disks on the spindle 93, each having one or more additional heads associated therewith. The present invention is compatible with all such configurations.

The head 107 is electrically coupled at 108 to inputs of a preamplifier 111, and the outputs of the preamplifier 111 are coupled to the connector 71 through an electrostatic discharge buffer (EDB) 112. The buffer 112 is a commercially available device, and therefore not described here in detail. Alternatively, however, the buffer 112 could be a custom device of comparable function. The buffer 112 receives control signals at 113 through the connector 71. When the cartridge 11 is withdrawn from the cradle 12, the buffer 112 is disabled, and electrically isolates the preamplifier ill and the head 107 from the pins of connector 71, in order to protect the preamplifier 111 and head 107 from electrostatic energy. When the cartridge 11 is received in the cradle 12, the buffer 112 receives control signals at 113 which cause it to electrically couple the preamplifier 111 to the connector 71, in order to facilitate system operation. Although the disclosed embodiment of FIG. 3 provides both the buffer 112 and the conductive layer 76 of cover 73 for the purpose of protecting the cartridge 11 from electrostatic energy, it will be recognized that it would be possible to omit one of the buffer 112 and conductive layer 76.

The end of the actuator arm 101 remote from the head 107 is bifurcated to define two legs, one of which has a magnetically permeable part 116 at the outer end thereof, and the other of which has a coil 117 at the outer end thereof. The coil 117 is electrically coupled at 118 to pins of the connector 71. The coil 117 is physically located very close to a wall of the housing 59 of the cartridge 11. Closely adjacent this wall of the housing 59, on the opposite side thereof from the coil 117, the cradle 12 has a stationary magnet 121. The electrical signals supplied at 118 to the coil 117 cause the coil to create an electromagnetic field, which interacts with the magnetic field of magnet 121 so as to effect rotational movement of the actuator arm 101 about the pivot 102. The arm 101, head support 106, head 107, pivot 102, and coil 117 may be referred to as an actuator.

In the disclosed embodiment, in order to increase the interaction between the magnetic fields of the coil 117 and the magnet 121, the portion of the cartridge housing 59 between the coil 117 and the magnet 121 has a thickness which is less than the thickness of other portions of the housing. Consequently, a cover 122 is provided to cover this thin wall portion of the housing 59 when the cartridge 11 is removed from the cradle 12, in order to reduce the possibility of damage to this thin wall portion. The cover 122 can be moved between an open position shown diagrammatically in FIG. 3, in which the thin wall portion is exposed, and a closed position in which the thin wall portion is covered. The movement of the cover 122 can be effected manually, or can alternatively be effected automatically during cartridge insertion and withdrawal, by an appropriate mechanism of a type which is known in the art and not shown here.

Due to the fact that a wall portion of the housing is between the coil 117 and the magnet 121, the magnet 121 in the disclosed embodiment is somewhat stronger than would be the case if it were disposed within the housing 59, as part of the cartridge 11. Consequently, when the cartridge 11 has been withdrawn from the cradle 12, the magnet 121 will exert a strong attractive force with respect to small pieces of loose metal such as paper clips and staples. In order to reduce the extent to which such stray pieces of metal may be drawn to the magnet 121 when the cartridge 11 is not present, a cover 123 is provided for the magnet. The cover 123 is preferably made of a material which is not magnetically permeable and which will help to prevent pieces of metal from being drawn into engagement with the magnet 121 when the cover 123 is covering the magnet 121. The cover 123 can be moved between an open position shown in FIG. 3, in which the magnet 121 is exposed, and a closed position in which it covers the magnet 121. The movement of the cover 123 can be effected manually, or can alternatively be effected automatically during cartridge insertion and withdrawal by an appropriate mechanism of a type which is known in the art and not shown here.

Figure 4:
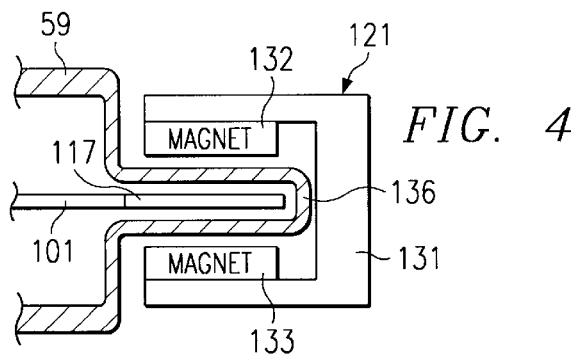
FIG. 4 is a diagrammatic sectional view of a portion of the information storage device of FIG. 3.

FIG. 4 shows in more detail the actual structural configuration of the coil 117 and the magnet 121 which are used in the disclosed embodiment of FIG. 3. More specifically, FIG. 4 is a diagrammatic sectional view, in which it can be seen that the magnet 121 is an assembly which includes a U-shaped element 131, and two permanent magnets 132 and 133 that are each mounted on the inner side of a respective leg of the element 131, adjacent the outer end thereof. An assembly of this type is sometimes referred to as a magnetic circuit. The element 131 is made of a metal material which conducts a magnetic field. The thin wall portion of the housing 59 is indicated at 136, and forms an edge portion of the housing which has a reduced height. When the cartridge 11 is received within the cradle 12, the portion of reduced height, which is defined by the thin wall portion 136, is received physically between the magnets 132 and 133. As shown in FIG. 4, the coil 117 on the actuator arm 101 is disposed within this reduced height portion of the housing 59, so that the coil 117 is also disposed physically between the magnets 132 and 133 when the cartridge is in the cradle 12.

When the disk 91 is rotating at a normal operational speed, the rotation of the disk induces the formation between the disk surface and head 107 of an air cushion which is known commonly known as an air bearing. Consequently, the head 107 floats on the air bearing while reading and writing information to and from the disk, without direct physical contact with the disk. As the arm 101 is pivoted due to interaction between the coil 117 and the magnet 121, the head 107 moves approximately radially with respect to the disk. Thus, through relative movement of head 107 and disk 91 resulting from rotation of the disk 91 and also pivotal movement of the arm 101, the head 107 can be moved to a position aligned with any specific location on the operational portion of the surface of the disk 91.

When the disk 91 is at rest, the air cushion will not exist. Therefore, the head 107 is moved to a special region of the disk at a radially inner portion thereof, adjacent the spindle 93. This is commonly known as the park position of the head. Since the cartridge 11 may be subjected to significant shocks during time periods when it is not received within the cradle 12, a special parking arrangement is provided to help maintain the arm 101 and head 107 in the park position. In this regard, and as previously mentioned, the arm 101 has a magnetically permeable part 116 thereon. As shown in FIG. 3, a head park magnet 141 is provided closely adjacent the wall of housing 59, the magnetically permeable part 116 being in close proximity to the head park magnet 141 when the arm 101 and head 107 are in the park position.

The cradle 12 includes a shunt 142 which, when the cartridge 11 is received in the cradle 12, is disposed closely adjacent the wall of housing 59 on the opposite side thereof from the head park magnet 141. The shunt 142 serves to reduce the magnetic force exerted by the head park magnet 141 on the magnetically permeable part 116 and thus on the arm 101. In contrast, when the cartridge 11 is withdrawn from the cradle 12 and the shunt 142 is not interacting with the head park magnet 141, the head park magnet 141 will exert a stronger force on the magnetically permeable part 116, in order to more strongly resist movement of the arm 101 away from the park position. This interaction will now be explained in more detail with reference to FIG. 5.

Figure 5:
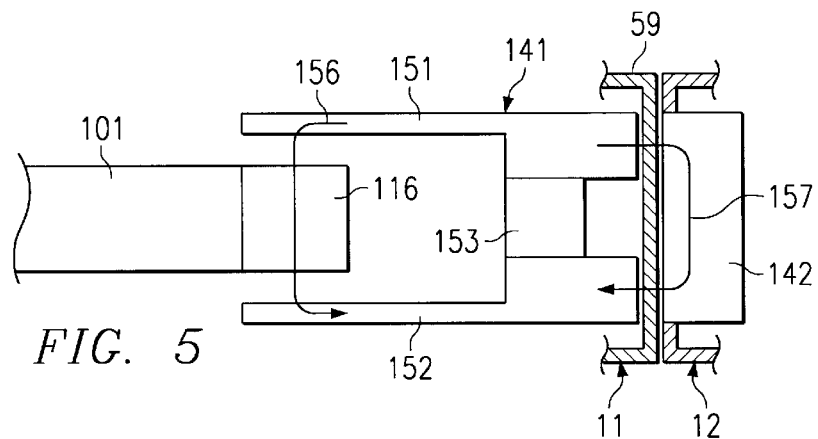
FIG. 5 is a diagrammatic sectional view of a further portion of the information storage device of FIG. 3.

More specifically, as shown in FIG. 5, the head park magnet 141 is an assembly which includes two elongate spaced elements 151 and 152, and a permanent magnet 153 which is disposed between the elements 151 and 152 adjacent one end of each. The end portions of the elements 151 and 152 which have the magnet 153 therebetween are disposed closely adjacent the wall 59 of the cartridge 11. The portion of the housing 59 adjacent the head park magnet 141 may optionally have a reduced thickness, and the covers 122 and 123 of FIG. 3 may optionally be of a size which is sufficiently large so that the cover 122 covers the thin wall portions for both the coil 117 and the head park magnet 141, and the cover 123 covers both the magnet 121 and the shunt 142, to limit the extent to which small pieces of metal such as staples and paper clips can be drawn to magnetic parts.

The elongate elements 151 and 152 are made of a material which will conduct a magnetic field, such as a metal. Consequently, the magnetic field generated by the permanent magnet 153 is conducted through the elements 151 and 152, so that the elements 151–152 and the magnet 153 cooperate to set up a magnetic field having lines of flux 156 that extend between the end portions of the elements 151–152 that are remote from the magnet 153. When the actuator arm 101 is in its park position, the magnetically permeable part 116 thereon is disposed between these end portions of the elements 151–152, as shown in FIG. 5, so as to be subject to the lines of flux 156. As a result, there is a strong magnetic resistance to the movement of magnetically permeable part 116 away from the position shown in FIG. 5. Consequently, the arm 101 is urged to remain in its park position.

When the cartridge 11 is inserted in the cradle 12, the shunt 142 ends up being positioned closely adjacent the ends of the elements 151–152 which have the magnet 153 therebetween, as shown in FIG. 5. In the disclosed embodiment, the shunt 142 is made of a magnetically permeable material, although it could alternatively be a permanent magnet. The magnetically permeable shunt 142 interacts with the head park magnet 141 in a manner which shunts a part of the magnetic field generated by the magnet 153 away from the higher reluctance path indicated at 156, and along a lower reluctance path having lines of flux 157 which extend through the shunt 142. This reduces the strength of the magnetic field 156 which interacts with the magnetically permeable part 116, so that it is much easier for the part 116 to move away from the head park magnet 141. That is, the arm 101 with the part 116 and head 107 thereon can more easily move away from its park position. When the cartridge 11 is subsequently withdrawn from the cradle 12, the shunt 142 will no longer be adjacent the head park magnet 141, as a result of which the magnetic field at 156 will increase again, thereby again increasing the force which tends to retain the magnetically permeable part 116 and thus the actuator arm 101 and head 107 in the park position.

Referring again to FIG. 3, and as mentioned above in association with FIG. 2, a latching mechanism is provided to releasably hold the cartridge 11 in the cradle 12. This avoids an unexpected withdrawal of the cartridge while a read or write operation to the disk 91 is in progress, to thereby avoid corruption of the data on the disk 91, and/or the application of a mechanical shock while a read or write is in progress, which might damage the head 107 or the disk 91. This latching mechanism is shown diagrammatically in FIG. 3 at 171–172, where 171 is a portion of the latching mechanism that is part of the cartridge 11, and 172 is a portion of the latching mechanism that is part of the cradle 12. When the cartridge 11 is inserted into the cradle 12, the portions 171 and 172 mechanically engage each other, and cooperate in a manner which automatically latches the cartridge 11 in the cradle 12. For example, a not-illustrated pawl on the cradle 12 could engage a not-illustrated detent on the cartridge 11, and could be releasably held in place by a solenoid. The latching effect between the latch portions 171–172 is indicated diagrammatically in FIG. 3 by the broken line at 174. The latch portion 172 disposed in the cradle 12 can be electrically released by a signal supplied on a line 175, as discussed later.

The cartridge 11 may have some form of detectable identification thereon, for example to permit the cradle 12 to distinguish different versions of the cartridge 11 from each other. This identification portion is represented diagrammatically in FIG. 3 at 181. The identification portion 181 is optional, and is therefore shown in broken lines in FIG. 3. The cradle 12 has a detect portion 182, which is aligned with the identification portion 181 when the cartridge 11 is inserted in the cradle 12. The detect portion 182 is capable of reading the identification portion 181. For example, one known technique which can be used here is to provide a reflective arrangement on the exterior of the cartridge 11 to serve as the identification portion 181. The detector portion 182 can include a not-illustrated light emitting diode (LED) which transmits light toward the identification portion 181, and can also include a not-illustrated sensor which can detect the amount of light reflected by the identification portion 181. The identification portions 181 on different types of cartridges would reflect light differently, so that the detect portion 182 could tell the difference between them.

An alternative technique, which is also known, is to provide a phosphor material on the exterior of the cartridge 11, to serve as the identification portion 181. The detect portion 182 would expose the phosphor identification portion 181 to light, and then use a sensor to monitor the rate of decay of the emission of radiation by the phosphor. Different types of cartridges would have different phosphor materials which would have different decay rates, so that the detect portion 182 could tell the different types of cartridges from each other. Other techniques could also be used to permit the detect portion 182 to interact with the identification portion 181 in order to identify the type of cartridge 11 which is currently in the cradle 12.

The cartridge 11 includes a read-only memory (ROM) 186 which is coupled by lines 187 to the connector 71. In the disclosed embodiment, the ROM 186 is a serial type of electrically erasable programmable read-only memory (EEPROM), so that information can be read out from the ROM 186 through the connector 71 on a single serial data line, thereby reducing the number of connector pins associated with the ROM 186. The ROM 186 contains information about the cartridge 111, such as the storage capacity of disk 91, the number of concentric tracks on disk 91, the number of disks, the type of read/write head 107, the number of read/write heads, the format used for storing information on the disk 91, the information transfer rate for the head 107, information regarding the pivot 102 (such as whether it uses a bearing or bushing), information regarding the coil 117 (such as its inductance), information regarding the motor 92 (such as motor constants and inductances), servo information used to control tracking of the head 107 relative to the disk 91, blocks of firmware that can be used in the cradle, and so forth. When the cartridge 11 is first plugged into the cradle 12, the cradle 12 can read this information from the ROM 186, so that the cradle 12 has all the information it needs about operational characteristics of the specific cartridge 11 which has been inserted, and thus can smoothly and successfully interact with that particular cartridge 11. Although the disclosed embodiment uses a ROM 186, it will be recognized that there are alternatives, such as the use of jumpers or microswitches in place of the ROM 186, or use of an encryption chip containing nonvolatile memory in place of the ROM 186.

The cartridge 11 also includes an hour meter 191, which is coupled by lines 192 to the connector 71. The hour meter 191 is a circuit which keeps track of information such as the cumulative amount of time that power has been applied to the cartridge 11, and/or the cumulative amount of time that the spin motor 92 has spent rotating the disk 91. The cradle 12 can read this type of information out of the hour meter 191 through the connector 71, so that it knows how much use the particular cartridge 11 has had. As a result, if the cartridge 11 is of a type which has an expected operational lifetime of 5,000 hours, and if the hour meter 191 indicates that the cartridge 11 is approaching this amount of cumulative operational use, the cradle 12 can cooperate with the host system 17 to provide a user warning, so that the user can move the information on the cartridge to a different cartridge before any catastrophic failure occurs. Although the disclosed embodiment maintains time information in the hour meter 191, it will be recognized that there are alternative way to maintain such time information in the cartridge, including storing such information on the disk 91 rather than in a separate circuit such as the hour meter 191.

The cradle 12 includes a drive electronics circuit 201, which in general corresponds to certain electronics that would be found in a standard hard disk drive, and which handles control of functions in the cartridge 11 that are involved with reading data from and writing data to the disk 91. The drive electronics circuit 201 may optionally be implemented with an existing integrated circuit of the type commonly used in existing hard disk drives. The drive electronics circuit 201 includes a drive control circuit 202, which in turn includes a microprocessor 206 and memory 207. The memory 207 is a diagrammatic representation of multiple types of memory, including some ROM and also some random access memory (RAM). The ROM in the memory 207 may be implemented in the form of flash memory, in order to allow it to be updated. The drive electronics circuit 201 includes a motor driver circuit 211 of standard configuration, which is controlled by the drive control circuit 202, and which outputs control signals to the spin motor 92 in the cartridge 11 through the connectors 72 and 71.

The drive electronics circuit 201 also includes a read channel circuit 212 of standard configuration, which receives signals from the head 107 that have propagated through preamplifier 111, buffer 112, and connectors 71–72. The output of the read channel circuit 212 is supplied to the drive control circuit 202. The drive electronics circuit 201 also includes a voice coil motor (VCM) driver circuit 213 of standard configuration, which is controlled by the drive control circuit 202, and which has its outputs coupled through the connectors 71 and 72 to the lines 118 for the coil 117 in the cartridge 11. The drive control circuit 202 also outputs control signals on lines 216, which are coupled through connectors 71 and 72 to the lines 113 which serve as control inputs for the buffer 112.

The cradle 12 further includes a bridge circuit 231, which communicates with the drive electronics circuit 201 through an interface 232. In the disclosed embodiment, the interface 232 conforms to an industry standard interface protocol commonly known as the AT Attachment (ATA) protocol. The ATA protocol has several versions, and the one used here is the intelligent drive electronics (IDE) version. This existing protocol was specifically developed to facilitate communication with the drive electronics for a disk drive.

The bridge circuit 231 includes a microprocessor 236, and a memory 237. The memory 237 includes both RAM and ROM, where the ROM is flash memory that can be selectively electrically reprogrammed when necessary. The bridge circuit 231 also includes a power management circuit 241, which permits the bridge circuit 231 to control a power management function with respect to the drive electronics circuit 201. In the disclosed embodiment of FIG. 3, the power management circuit 241 has an output 242 which provides operating power to the drive electronics circuit 201. When the line 242 is activated, the drive electronic circuit 201 has power, whereas when the line 242 is deactivated, the circuit 201 does not have power. It will be recognized that the power management circuit 241 could provide a more sophisticated level of power management, for example by independently controlling the power to each of the control circuit 202, motor driver circuit 211, read channel circuit 212 and VCM driver circuit 213, so that they can be powered up or down in a predetermined sequence.

The bridge circuit 231 is coupled through lines 246 and the connectors 71–72 to the lines 187 for the ROM 186. This permits the bridge circuit 231 to read out the information which is stored in the ROM 186. The bridge circuit 231 is also coupled through lines 247 and connectors 71–72 to the lines 192 for the hour meter 191. This permits the bridge circuit 231 to read the information which is present in the hour meter 191. The output of the detect portion 182 is coupled through a line 251 to the bridge circuit 231, so that the bridge circuit has access to the information represented by the identification portion 181 of the cartridge 11.

The bridge circuit 231 is coupled through the line 175 to the portion 172 of the latch mechanism, and can selectively produce a signal on line 175 which releases the portion 172 of the latch mechanism, so as to eliminate the latching effect 174 and permit the cartridge to be withdrawn from the cradle 12. As discussed above in association with FIG. 2, the cradle 12 has a manually operable release button 53, which is a momentary switch, and which is coupled at 252 to an input of the bridge circuit 231.

The bridge circuit 231 has a further interface 256, through which the bridge circuit can communicate with the host system 17. The interface 256 conforms to an industry standard protocol which, in the disclosed embodiment, is different from the protocol used for interface 232. In particular, the interface 256 uses a protocol commonly known in the industry as the AT Attachment Packet Interface (ATAPI) protocol.

One function of the bridge circuit 231 is to take commands received through the interface 256, which conform to the ATAPI protocol and relate to operation of the drive electronics circuit 201, and to convert these commands to commands which conform to the ATA protocol. The converted commands are then passed through the interface 232 to the drive electronics circuit 201. A further function of a bridge circuit 231 is to handle local functions which relate to the removability of the cartridge 11, and which thus would not be present in a pre-existing self-contained disk drive where the disk and the read/write head are permanently coupled to the drive electronics. Thus, for example, information about the cartridge 11 obtained from the ROM 186 and/or the identification portion 181 are supplied to the bridge circuit 231. Further, the bridge circuit 231 is responsive to the release button 53, and also controls the latch mechanism 171–172.

The bridge circuit 231 coordinates the operation of the cradle 12 with the operation of host system 17. For example, if a large block of data is being written to the disk 91 when the user happens to press the release button 53, the bridge circuit 231 would notify the host system 17 that the release button 53 had been pressed, and then the host system 17 and bridge circuit 231 would cooperate to either interrupt the data transfer or permit it to finish, after which the bridge circuit 231 would use line 175 to release the latch mechanism 171–172 in order to permit the cartridge 11 to be withdrawn.

The cradle 12 may optionally include an interface circuit 261, which is coupled between the bridge circuit 231 and the host system 17. Since the interface circuit 261 is optional, it is shown in broken lines in FIG. 3. The interface circuit 261 includes a microprocessor 262, and a memory 263 which includes both ROM and RAM. Interface circuit 261 has the interface 256 on one side thereof, and a further interface 266 on the opposite thereof. If the host system 17 is configured to communicate with the cradle 12 using the above-mentioned ATAPI protocol, then the interface circuit 261 is omitted, and the interfaces 256 and 266 are effectively coupled directly to each other so as to form a single interface through which the host system 17 and the bridge circuit 231 communicate with each other. On the other hand, if the host system 17 is configured to communicate with the cradle 12 using a protocol other than ATAPI, then the interface circuit 261 is provided in the cradle 12 to provide the necessary conversion between the host system protocol and the ATAPI protocol.

For example, the host system 17 and interface circuit 261 may communicate with each other through the cable 18 using a selected one of several different protocols, which in the disclosed embodiment include the industry standard Small Computer System Interface (SCSI) protocol, the industry standard Universal Serial Bus (USB) protocol, the industry standard IEEE 1394 protocol promulgated by the Institute of Electrical and Electronic Engineers (IEEE), or the industry standard Personal Computer Memory Card International Association (PCMCIA) protocol, which is also known as the PC Card protocol. Other protocols could alternatively be used for communication between the host system 17 and the interface circuit 261. The cradle 12 can thus be adapted for use with any of several different host systems, by either omitting the interface circuit 261, or by including one of several different interface circuits 261 which each implement a respective different protocol with respect to the host system 17.

If the host system 17 communicates with the cradle using one of the USB, PCMCIA or IEEE 1394 protocols, the host system 17 will provide power through the cable 18, and the cradle 12 and cartridge 11 can operate from this power, unless they need more power than that permitted by the specification for the respective protocol. If they need more power than permitted by the specification, a not-illustrated external power source would have to be provided for the cradle 12, such as a converter which plugs into a standard 110 volt wall socket and provides direct current operating power to the cradle 12. On the other hand, if the host system communicates with the cradle using either the ATAPI or SCSI protocol, power would not be provided through the cable 18, and another power source such as a converter would be needed.

The foregoing discussion mentions the specific protocols of ATA, ATAPI, USB, SCSI, PCMCIA, and IEEE 1394. This is because these currently are common protocols in the industry. However, it will be recognized that the invention is entirely suitable for use with other existing or future protocols.

Although the bridge circuit 231 and interface circuit 261 are physically separate circuits in the embodiment of FIG. 3, it will be recognized that it would alternatively be possible to integrate them into a single circuit having a single processor. In this regard, one possible option would be to provide several versions of this circuit which each communicate with the drive electronics circuit 201 according to the ATA protocol, and each communicate with the host system 17 using a respective one of the ATAPI, USB, SCSI, PCMCIA, and IEEE 1394 protocols, as appropriate. Alternatively, a single version of the combined circuit could be provided, with a processor that had sufficient intelligence to communicate with the drive electronics circuit 201 according to the ATA protocol, and to communicate with the host system 17 using any of the ATAPI, USB, SCSI, PCMCIA, and IEEE 1394 protocols, as appropriate. In each case, it would not be necessary to translate commands into the ATAPI protocol unless that was the protocol being used by the host system 17 for communication with the cradle 12.

In a similar manner, although the embodiment of FIG. 3 shows the drive electronics circuit 201 as being separate from each of the bridge circuit 231 and the interface circuit 261, the drive electronics circuit 201 could optionally be combined with the bridge circuit 231, or with both the bridge circuit 231 and the interface circuit 261. In each case, it would not be necessary to translate commands into the ATA protocol. Further, if the interface circuit 261 was part of the combination, it would not be necessary to translate commands into the ATAPI protocol unless that was the protocol being used by the host system 17 for communication with the cradle 12.

In the disclosed embodiment, the cradle 12 has a connector 276 which is releasably coupled to a connector 277 at the end of cable 18. The connectors 276 and 277 are of an industry standard type. The hardware of the host system 17 is a standard computer, for example a commercially available computer of the type commonly known as a personal computer or a workstation. The host system 17 includes a microprocessor 281 and a memory 282, where the memory 282 includes RAM, ROM and a hard disk drive. The host system 17 also includes a compact disk read-only memory (CD-ROM) drive 286, which can removably receive a compact disk 287. The system 17 further includes a standard floppy disk drive 288, which can removably receive a floppy disk 289.

The system 17 has an interface 292 such as a modem, through which it can be coupled to the Internet. Further, the system 17 has an interface 296, which permits it to communicate with the cradle 12 through cable 18. In the disclosed embodiment, and as discussed above, the interface 296 conforms to one of several industry standard protocols such as the ATAPI protocol, the SCSI protocol, the PCMCIA protocol, the USB protocol, or the IEEE 1394 protocol.

Figure 6:
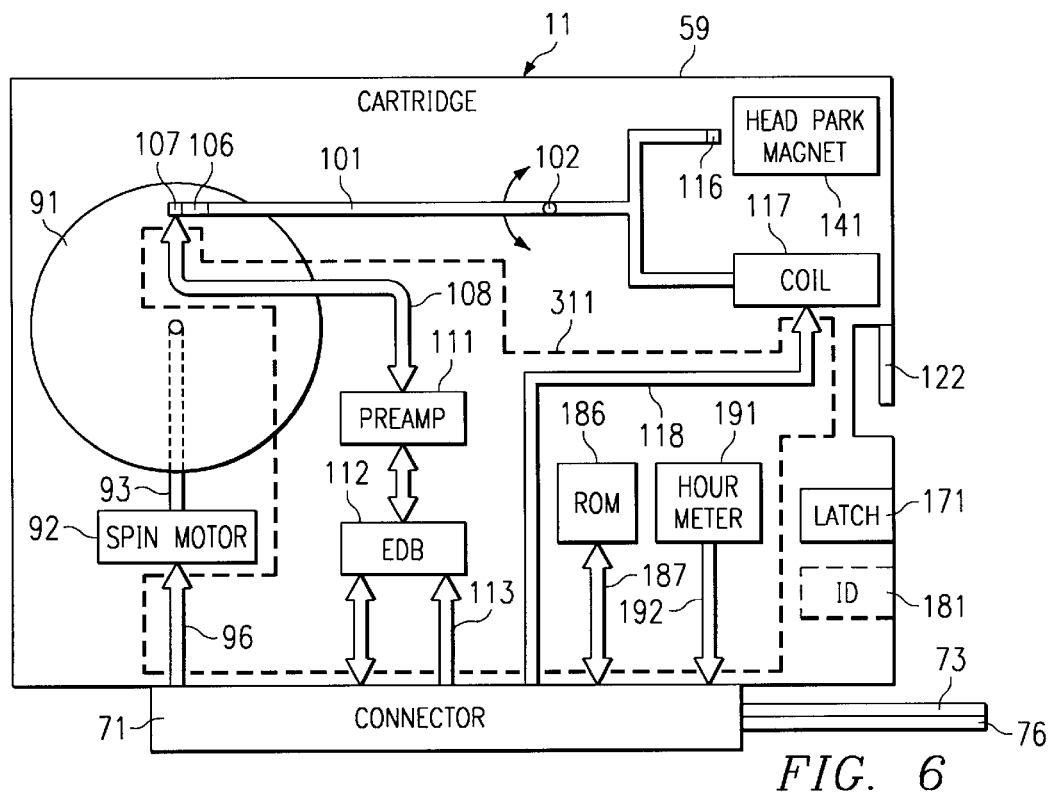
FIG. 6 is a diagrammatic view similar to a portion of FIG. 3, showing the cartridge from the information storage device of FIGS. 1 and 3.

FIG. 6 is a diagrammatic view of the cartridge 11, showing the same basic internal structure as FIG. 3. According to a feature of the present invention, the connector 71 is electrically coupled to all components within the cartridge 11 by a single flex circuit, which is indicated diagrammatically in FIG. 6 by a broken line 311. In the disclosed embodiment, this flex circuit 311 has mounted on it the integrated circuits for the preamplifier 111, the buffer 112, the ROM 186, and the hour meter 191. The flex circuit 311 is coupled at one end to the connector 71, and at its other end to the spin motor 92, the head 107, and the coil 117. The end of the flex circuit remote from the connector 71 may be bifurcated in order to facilitate the connections to each of the motor 92, head 107, and coil 117, provided the bifurcations are integral parts of the flex circuit. Although use of a single flex circuit is one significant feature of the invention, it will be recognized that there are other features of the invention which can be used in cartridges that have the single flex circuit, as well as cartridges that use other techniques to effect the needed electrical coupling between components.

As discussed above, it is customary to move each head of a disk drive in a radial direction to a radially inner or outer edge portion of the disk when the disk drive is not in use, so that an unexpected shock or jolt does not cause damage to the disk or head due to engagement therebetween. In this regard, a significant concern is possible damage to the layer of magnetic recording material on the surface of the disk, since such damage may render that portion of the disk incapable of being properly read or written, with a loss of any data that is already stored there. Consequently, in a standard park position, the head is not radially aligned with the portion of the magnetic surface layer used to store information, thereby minimizing the likelihood that a shock or jolt will produce damage to that portion of the layer.

When the head is in the park position, a severe jolt or shock can produce damage to the head or disk as a result of what is known as head slap, and a significant concern here is damage to the head itself. Head slap occurs when the head is moved away from the disk due to a shock or jolt, and then moves back toward the disk and strikes the disk at a high velocity. In a cartridge of the type involved in the present invention, the potential for head slap is reasonably high, because the cartridge is highly portable. For example, there is a relatively high risk that the cartridge may be inadvertently dropped on the floor, or otherwise subjected to a relatively severe shock of jolt. Consequently, the present invention provides a technique for reducing the potential for head slap to occur. This is described in more detail with reference to FIG. 7.

Figure 7:
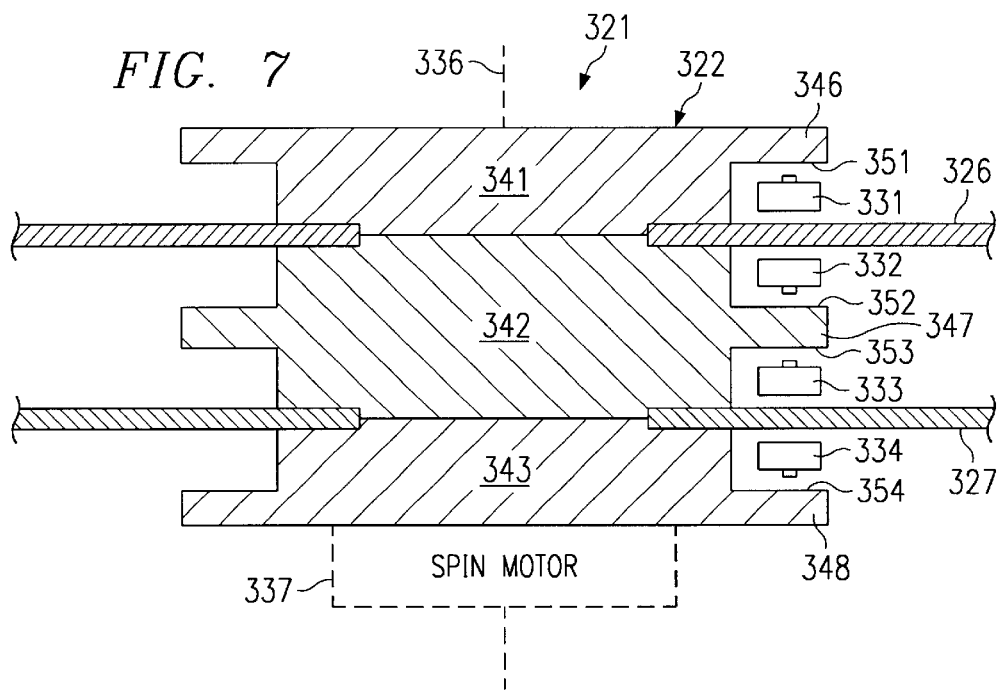
FIG. 7 is a diagrammatic sectional view of part of an information storage disk assembly, which is an alternative embodiment of an information storage disk assembly provided in the information storage device of FIGS. 1 and 3.

FIG. 7 is a diagrammatic sectional side view of a disk assembly 321, which is an alternative embodiment of the disk assembly discussed above in association with the cartridge 11. In particular, the cartridge 11 has only a single disk 91 and a single head 107, whereas the disk assembly 322 has two disks 326–327 mounted on a hub 322, and four heads 331–334 which are each associated with a respective side of a respective disk. The disk assembly 321 is rotated about an axis 336 by a spin motor, which is shown diagrammatically at 337. The hub 322 includes three disk clamps 341–343, which are fixedly secured to each other. The disk 326 has a radially inner edge portion fixedly clamped between the disk clamps 341 and 342, and the disk 327 has a radially inner (edge portion fixedly clamped between the disk clamps 342 and 343.

Each of the disk clamps 341–343 has a respective radially outwardly projecting annular flange or projection 346–348. The flange 346 has on the lower side thereof an annular limit surface 351 which is spaced from and faces the upper side of disk 326. Similarly, the flange 347 has annular limit surfaces 352 and 353 on opposite sides thereof which respectively face a lower surface of disk 326 and an upper surface of disk 327. The flange 348 has an annular limit surface 354 which is spaced from and faces the lower surface of disk 327. The heads 331–334 are shown in their park positions in FIG. 7, in which they are each disposed between the associated disk surface and a respective one of the limit surfaces 351–354. It will be recognized from FIG. 7 that the limit surfaces 351–354 serve to limit the extent to which any of the heads 331–334 can move away from the associated disk surface. The limit surfaces may engage the heads directly, or indirectly through engagement with the support structure for the heads.

Since the heads 331–334 in FIG. 7 are each prevented from moving a substantial distance away from the associated disk surface, they are also each prevented from moving back toward the disk surface at a relatively high velocity, which in turn substantially reduces or eliminates the possibility for the occurrence of head slap, which in turn reduces the potential for damage to the heads 331–334 as a result of head slap. It is known in the art that disk clamps need to be fabricated with a high degree of precision, in order to maintain proper disk spacing. Accordingly, adding the annular flanges 346–348 with limit surfaces 351–354 to the disk clamps 341–343 does not involve any significant increase to the fabrication cost of the disk clamps 341–343.

Figure 8:
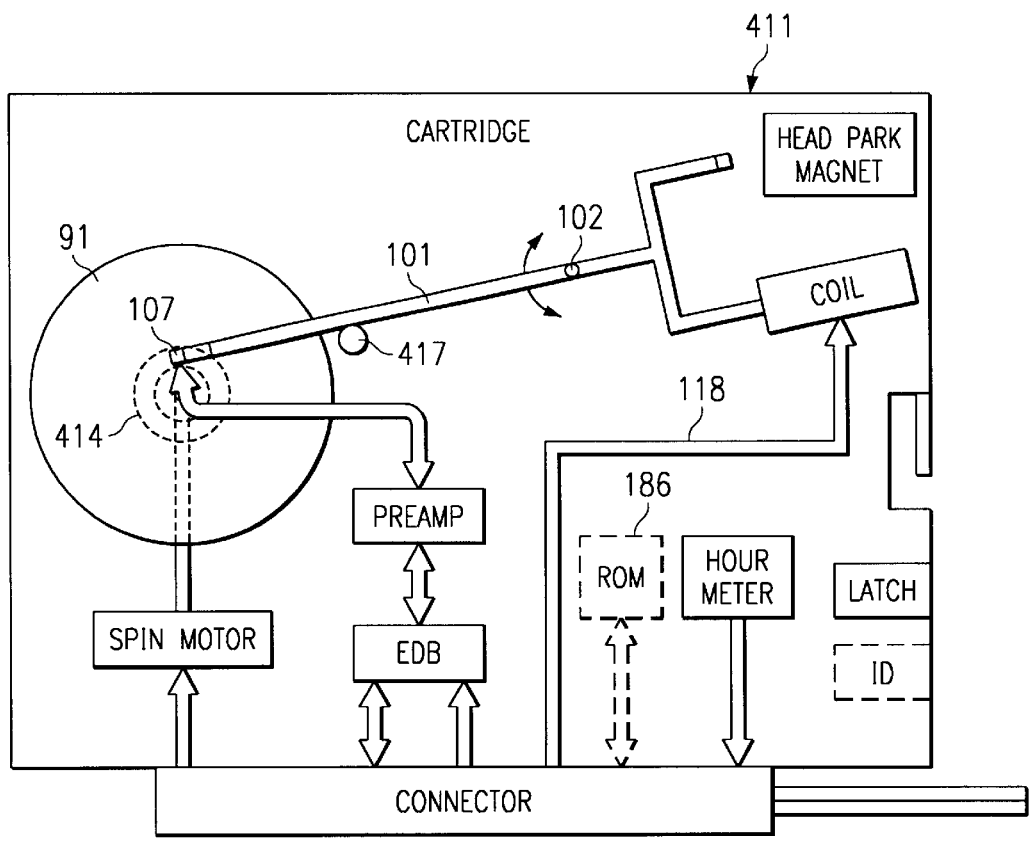
FIG. 8 is a diagrammatic view similar to FIG. 6, showing an alternative embodiment of the cartridge of FIG. 6.

FIG. 8 is a diagrammatic view of a cartridge 411 which is generally similar to the cartridge 11 of FIG. 6, except for differences which are described below. In the cartridge 411, the park position of the arm 101 and the head 107 is at the radially outer portion of the disk 91, rather than the radially inner portion thereof. In the cartridge 11 of FIG. 6, information about characteristics of the cartridge may be obtained from the ROM 186 and/or information portion 181. The cartridge 411 takes an alternative approach. In particular, the disk 91 of cartridge 411 has at a radially inner portion thereof a single track which is indicated diagrammatically at 414, which is relatively wide in comparison to other tracks, and which stores information about characteristics of the cartridge 411, including information of the type discussed above in association with the ROM 186. This track may optionally be implemented using a non-magnetic pattern, such as a disk indelible utility mark (DIUM). This non-modifiable mark can provide identification information, and is implemented in the form of an abated pattern on a portion of the track 414. The DIUM may extend across multiple tracks and can prevent accidental modification of the identification information.

The cartridge 411 has a hard mechanical stop 417 positioned so that, when the arm 101 is rotated counter-clockwise until it engages the stop 417, the head 107 will be aligned with the track 414. Because of the provision of the stop 417, data can be read from the track 414 without carrying out track following using a servo system. Consequently, information read from the track 414 can include the information necessary to initialize the servo system. Since the provision of the track 414 and the stop 417 could permit the ROM 186 to be optionally omitted, the ROM 186 is shown in broken lines in FIG. 8. It will be recognized that it would be alternatively possible to provide the track 414 near the radially outer edge of the disk 91.

In an alternative embodiment of the cartridge 411 of FIG. 8, the stop 417 could be omitted, and the special track 414 could be wide enough to permit information to be reliably read from it using default servo parameters. In still another alternative embodiment of the cartridge 411, the stop 417 could be omitted, and characteristic information about the cartridge could be split between the ROM 186 and the special track 414. The ROM 186 would be initially read in order to obtain some initial parameters, such as initial servo settings and other information needed to accurately read the special track 414, and then the special track 414 could be read in order to obtain a larger amount of information, possibly including blocks of firmware or the like.

Referring again to FIG. 3, still another technique by which the cradle 12 could determine characteristic information about a particular cartridge 11 would be to investigate the number of heads 107 which are present in the cartridge. One way to achieve this would be to electrically evaluate certain characteristics of the preamplifier 111, which will vary in dependence on the number of heads 107.

Figure 9:
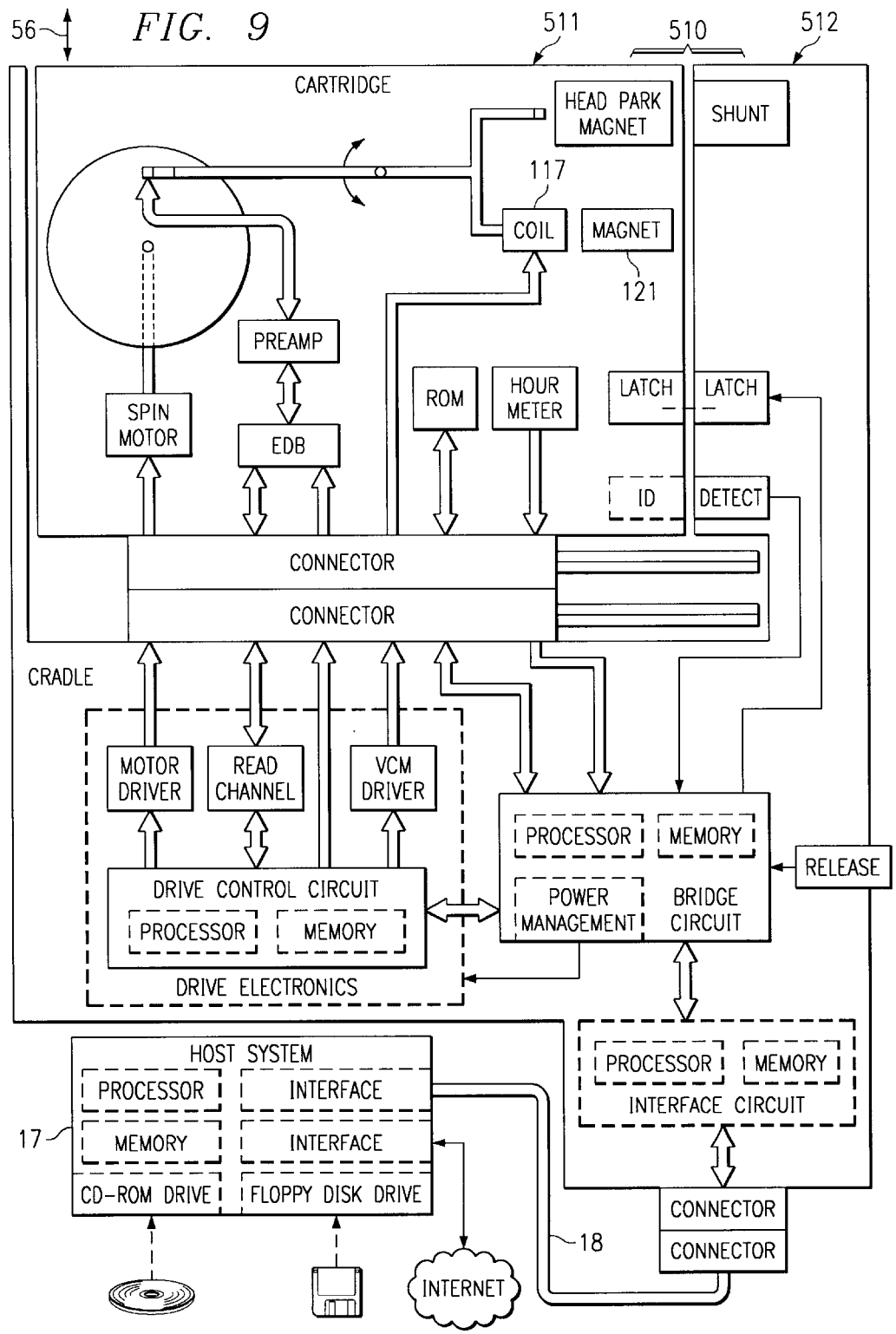
FIG. 9 is a diagrammatic view similar to FIG. 3, showing an alternative embodiment of the information storage device of FIG. 3.

FIG. 9 is a diagrammatic view similar to FIG. 3, but showing an information storage device 510 which is an alternative embodiment of the information storage device 10 of FIG. 3, and which includes a cartridge 511 and cradle 512. Device 510 of FIG. 9 is generally similar to device 10 of FIG. 3, except as described below. More specifically, in FIG. 3, the magnet 121 is disposed in the cradle 12, whereas in the device 510 of FIG. 9, the magnet 121 is disposed in the cartridge 511. As a result, the wall of the cartridge does not extend between the coil 117 and the magnet 121, but aside from this the configuration of the coil 117 and magnet 121 is generally similar to that shown in FIG. 4.

Figure 10:
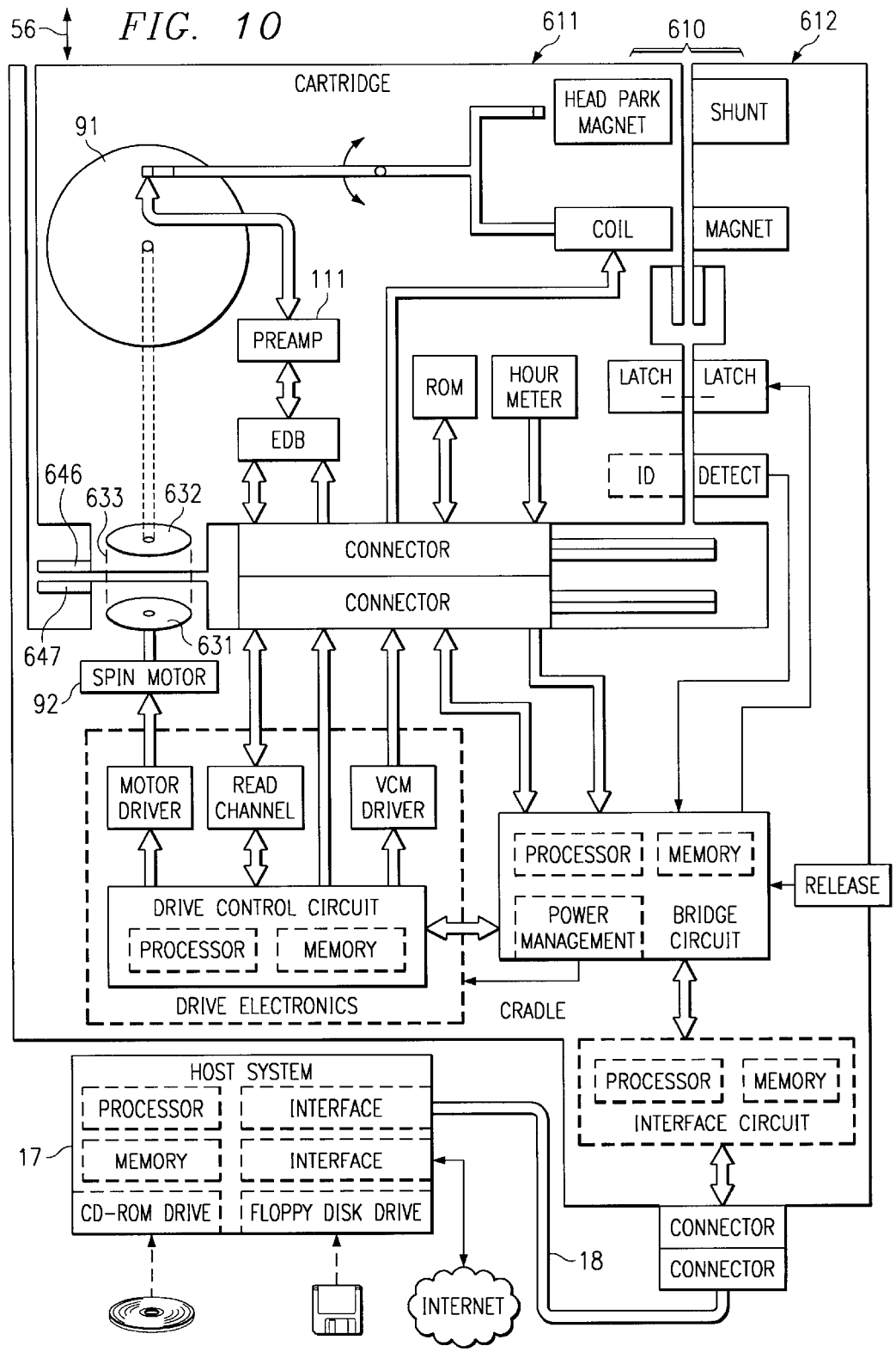
FIG. 10 is a diagrammatic view similar to FIG. 3, showing a further alternative embodiment of the information storage device of FIG. 3.

FIG. 10 is a diagrammatic view similar to FIG. 3, but showing an information storage device 610 which is an alternative embodiment of the device 10 of FIG. 3, and which includes a cartridge 611 and a cradle 612. The device 610 of FIG. 10 is generally similar to the device 10 of FIG. 3, except for differences which are described below. More specifically, in the device 610, the spin motor 92 for the disk 91 is located in the cradle 612 rather than in the cartridge 611. The spin motor 92 drives a magnetic disk 631, which is provided in the cradle 612 at a location adjacent the cartridge 611. The cartridge 611 has a further magnetic disk 632, which is rotatably driving coupled to the information storage disk 91. When the cartridge 611 is removably disposed in the cradle 612, the magnetic disks 631 and 632 are magnetically drivingly coupled to each other, as indicated diagrammatically at 633, so that rotation of the spin motor 92 effects rotation of the disk 91.

The magnetic disk 632 is disposed within the sealed housing of the cartridge 611, and a wall portion of the cartridge 611 disposed between the disks 631 and 632 is relatively thin in order to facilitate the effect of the magnetic coupling effect 633. Consequently, the cartridge 611 includes a cover 646 which may be moved between an open position shown in FIG. 10 and a closed position in which it covers the thin wall portion of the cartridge housing associated with the disk 632. The cover 646 may be moved manually, or may be moved automatically by a not-illustrated mechanism of a type which is known in the art.

The magnetic disk 631 in the cradle 612 may be disposed either inside or outside of a wall of the cradle 612. In either case, a cover 647 is provided to cover either the disk 631 or the associated thin wall portion of the cradle when the cartridge 611 is not present. The cover 647 may be moved manually between the open position of FIG. 10 and a closed position covering either the disk 631 or an associated thin wall portion, but could alternatively be moved automatically between these positions by a not-illustrated mechanism of a known type.

In an alternative embodiment of the device 610 of FIG. 10, the two magnetic disks 631 and 632 would be omitted. The spin motor 92 would be split so as to separate the stator and rotor, with the stator being provided in the cradle in approximately the location occupied by the disk 631 in FIG. 10. The rotor would be provided within the cartridge 611, in approximately the location occupied by the disk 632 in FIG. 10, and would be drivingly coupled to the disk 91. The magnetic field generated by the stator would act on the rotor through the wall of the cartridge housing, so as to effect rotation of the rotor and thus the disk 91.

Figure 11:
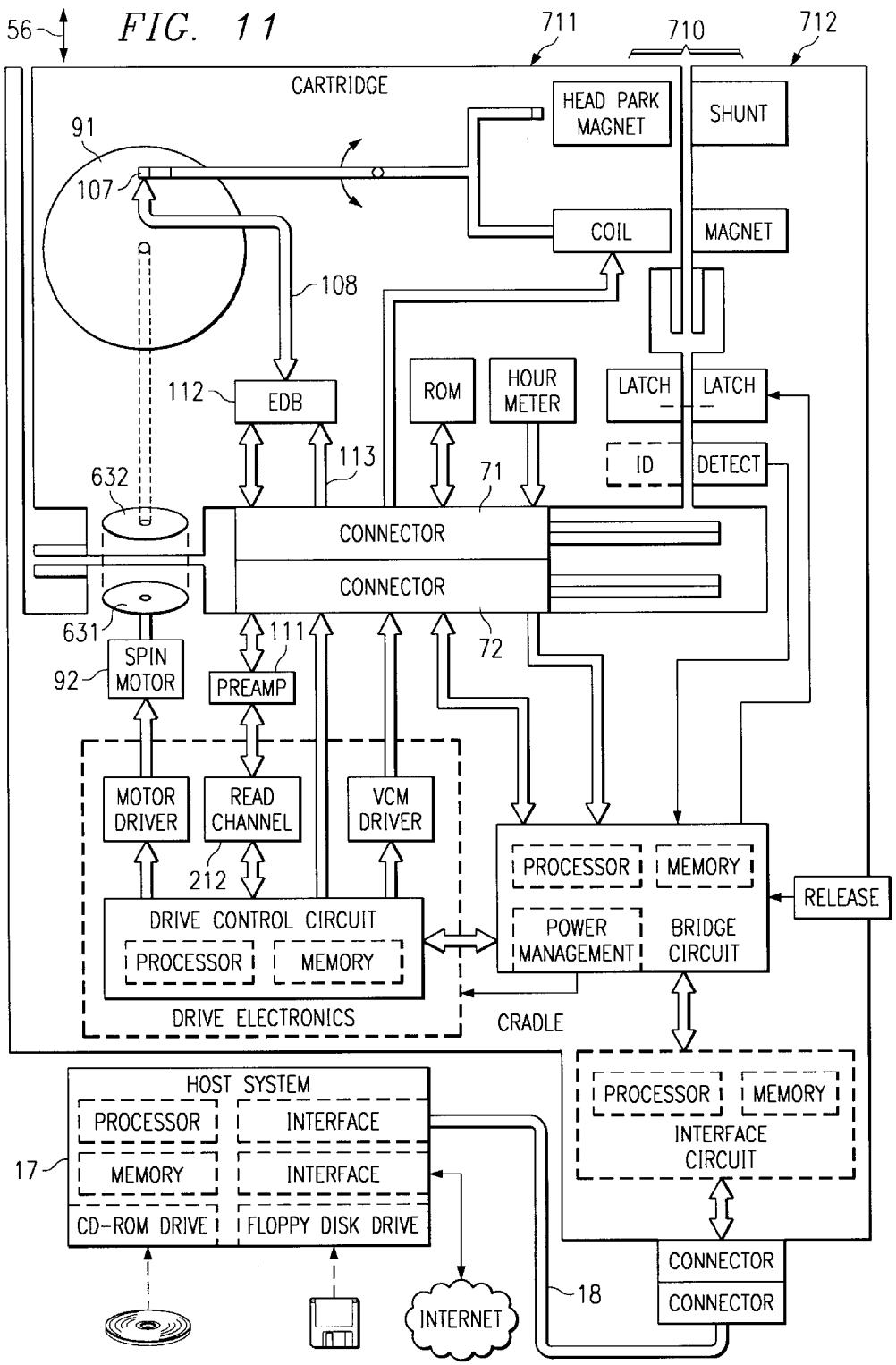
FIG. 11 is a diagrammatic view similar to FIG. 10, showing an alternative embodiment of the information storage device of FIG. 10.

FIG. 11 is a diagrammatic view similar to FIG. 10, showing an information storage device 710 which is an alternative embodiment of the information storage device 610 of FIG. 10. The device 710 is generally similar to the device 610, except as described below. One similarity, which has already been described above in association with device 610, is that the spin motor 92 is in the cradle 712 and is magnetically coupled by the disks 631 and 632 to the information storage disk 91 in the cartridge 711. The basic difference between the device 710 and the device 610 is that the preamplifier 111 has been moved from the cartridge 711 to the cradle 712, such that it is coupled between the connector 72 and the inputs to the read channel circuit 212. The output lines 108 from the head 107 are coupled directly to inputs of the buffer 112. Output signals from the head 107 thus flow through the buffer 112, the connectors 71–72, and the preamplifier 111 to the read channel circuit 212. It is expected that implementation of the embodiment of FIG. 11 may be facilitated through the use of a known technique which relates to the operation of the read channel 212, and which is commonly referred in the industry to as Partial Response Maximum Likelihood (PRML) technology. PRML technology can also be used in other embodiments disclosed herein.

Referring again to FIG. 3, and as mentioned above, the memories 207, 237 and 263 each include ROM, at least some of which is preferably implemented with flash memory in order to permit selective electrical reprogramming thereof when an update is needed. For purposes of convenience, the following discussion of reprogramming is presented in the context of the memory 237, but similar considerations would apply in the case of the memories 207 and 263.

From time to time, it may be desirable to update the program in memory 237. For example, some time after the cradle 12 of FIG. 3 has been sold to a customer, a new version of the cartridge 11 may be developed, in which information is stored on the disk 91 in a format different from the formats used for prior versions of the cartridge 11. Consequently, in order for the cradle 12 to operate satisfactorily with the new version of the cartridge, the program stored in memory 237 would need to be updated, in order to make the bridge circuit 231 familiar with the new format used to store data in the new version of the cartridge. There are several ways in which this update could be effected.

As one example, updated firmware for the memory 237 could be downloaded into the host system 17 from the Internet 293, or could be supplied to the host system 17 from a compact disk 287 or a floppy disk 289. Still another alternative is to store the new firmware on the disk 91 of a preexisting version of the cartridge 11, insert that cartridge into the cradle 12, and then transfer the new firmware from the disk 91 in that cartridge to the host system 17. In each of these situations, once the new firmware is temporarily resident in the host system 17, the host system 17 can send commands to the cradle 12 which place the cradle 12 in a mode where it will update an internal memory, such as the flash memory within memory 237, by writing into that flash memory the new firmware received from the host system 17 through the cable 18.

Alternatively, in the situation where the new firmware is provided on the disk 91 of an existing version of the cartridge 11, and where that cartridge has been plugged into the cradle 12, the host system 17 could instruct the cradle 12 to enter a mode where the cradle extracts that firmware from the disk 91 and writes it directly to the flash memory within memory 237, without the intermediate step of transferring the new firmware to and from the host system 17 through the cable 18. As yet another alternative, there are situations in which it would be possible for a new version of the cartridge 11 to be inserted into the cradle 12, even though the cradle 12 is not yet fully compatible with it, and for the cradle 12 to download the new firmware directly from the disk 91 on that new version of the cartridge. For example, and as discussed above in association with FIG. 8, every version of the cartridge might be required to have a special track such as that shown at 414 in FIG. 8, which would store certain information such as firmware, and which could be read without servo tracking through use of the stop 417. After being read out in this manner, the new firmware would be written directly to the flash memory within memory 237. The cradle could then switch to operation using this new firmware, and this new firmware would give the cradle the capability to properly interact in a normal operational manner with the remainder of the tracks on that new version of the cartridge 11, using normal servo tracking.

Figure 12:
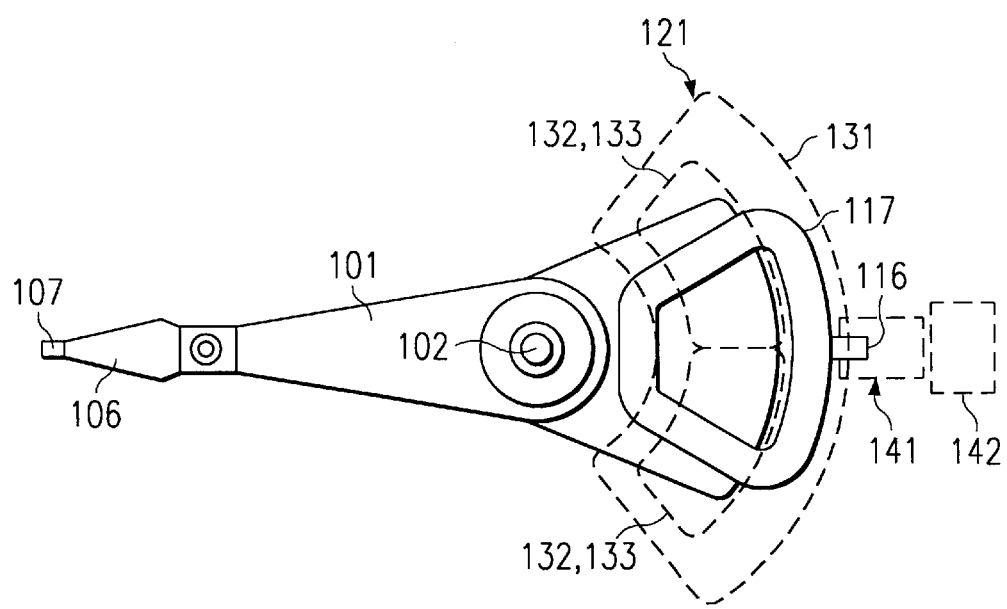
FIG. 12 is a diagrammatic top view showing details of an actuator mechanism which is an alternative embodiment of an actuator mechanism present in the information storage device of FIG. 2.

FIG. 12 is a diagrammatic top view showing an actuator mechanism which is an alternative embodiment of the actuator mechanism in information storage device 10 of FIG. 2. Similar parts are identified by similar reference numerals, and are not described again in detail here. One difference is that, in the embodiment of FIG. 12, the end of the arm 101 remote from the head 107 is not physically bifurcated. The magnetically permeable part 116 is mounted on or close to the coil 117. When the arm 101 and head 107 is in the park position, the magnetically permeable part 116 is disposed adjacent the head park magnet 141. The head park magnet 141 is mounted stationarily within the cartridge, and generates a magnetic field that yieldably resists movement of the arm 101 away from its park position when the cartridge is not within the cradle. When the cartridge is in the cradle, the shunt 142 in the cradle is disposed adjacent the head park magnet 141, as shown diagrammatically by broken lines in FIG. 12, and affects the magnetic flux produced by the head park magnetic 141 so as to reduce the attractive force exerted on the magnetically permeable part 116, in the manner already described in detail above.

Figure 13:
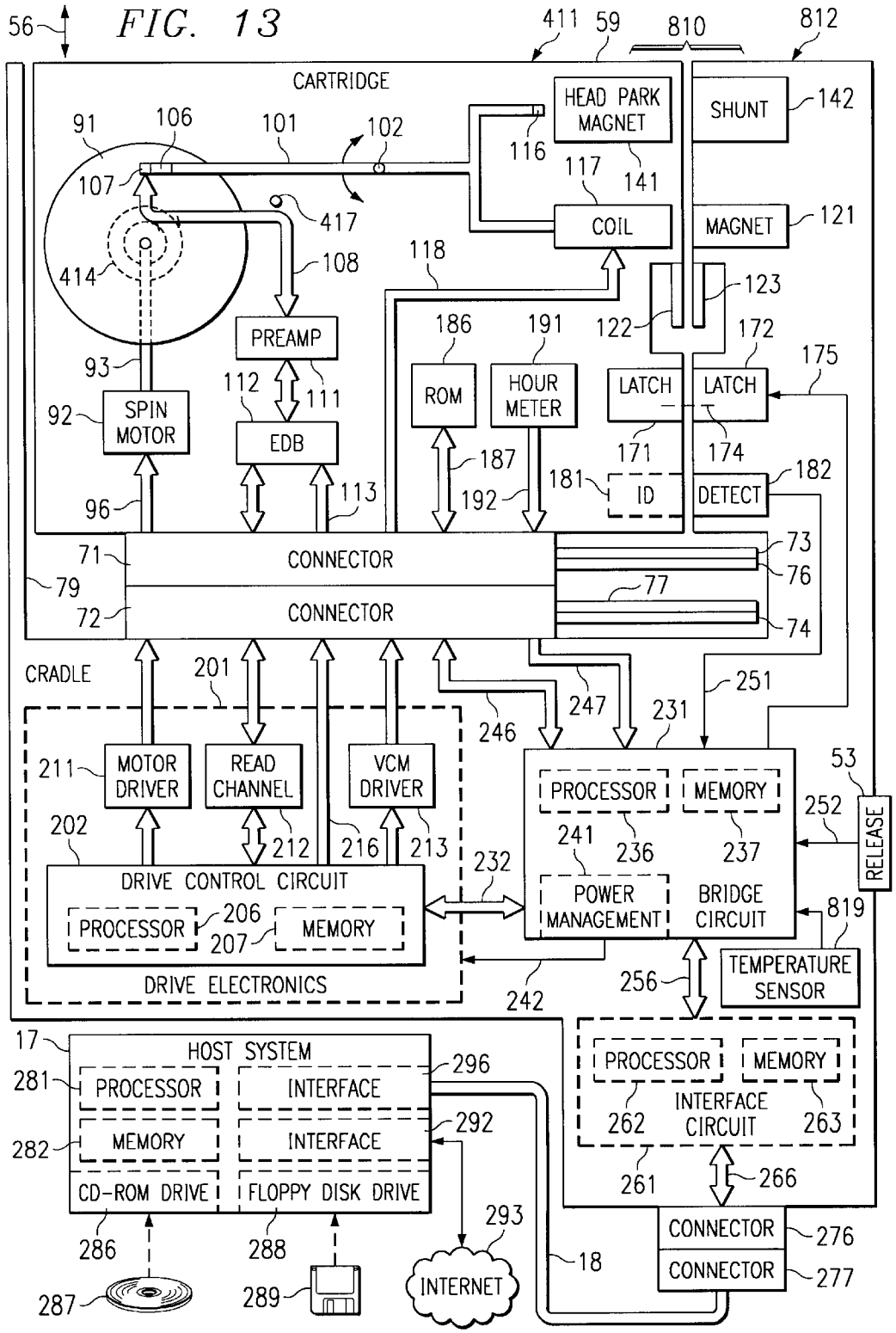
FIG. 13 is a diagrammatic view similar to FIG. 3, showing still another alternative embodiment of the information storage device of FIG. 3.

FIG. 13 is a diagrammatic view similar to FIG. 3, but showing an information storage device 810 which is still another alternative embodiment of the information storage device 10 of FIG. 3. The information storage device 810 includes a removable cartridge 411, which has previously been described in association with FIG. 8. As previously explained, this cartridge 411 includes the special track 414 at the radially inner portion of the disk 91, and includes the mechanical stop 417 which can engage the pivotal arm 101 in order to limit inward movement of the head 107 to a radial position in which the head 107 is aligned with the track 414.

The information storage device 810 also includes a cradle 812, which is generally similar to the cradle 12 of FIG. 3, except for the differences described hereinafter. In particular, the cradle 812 includes a temperature sensor 819, which has an output coupled to an input of the bridge circuit 231. The sensor 819 could alternatively sense an environmental condition different from temperature, such as humidity or ambient air pressure. As a further alternative, there could be multiple sensors, such as the temperature sensor 819, a separate humidity sensor, and/or a separate air pressure sensor, each such sensor having a respective output coupled to a respective input of the bridge circuit 231.

The bridge circuit 231 stores, for example in the memory 237, information which is shown in TABLE 1, and which represents several predefined temperature ranges. As evident from TABLE 1, the disclosed embodiment of FIG. 13 has five predefined temperature ranges, which are each associated with a respective identification code T0, T1, T2, T3 or T4. Each range corresponds to a respective 5° C. portion of the temperature spectrum from 10° C. to 35° C. Although five temperature ranges are shown in TABLE 1, it will be recognized that a larger or smaller number of temperature ranges could be provided.

TABLE 1

Temperature Ranges

| Range ID | Temperature Range |
|---|---|
| T0 | 10–15° C. |
| T1 | 15–20° C. |
| T2 | 20–25° C. |
| T3 | 25–30° C. |
| T4 | 30–35° C. |

The cradle 812 also stores, for example in the memory 237, a list of retry methods, as represented in TABLE 2. The left column in TABLE 2 is a series of letters which each uniquely identify a respective retry method, and the right column in TABLE 2 lists a series of different retry methods. In the disclosed embodiment, the retry methods listed in TABLE 2 are each a different technique which is known in the art, and these retry methods are therefore not illustrated and described here in detail.

In the event the cradle 812 determines that it is experiencing errors in reading data from the disk 91 of the cartridge 411, the cradle 812 can use one or more of the retry methods from TABLE 2 in succession, in an attempt to accurately read and thus recover the data as to which an error was experienced. The use of these retry methods is addressed again later.

TABLE 2

Retry Methods

| | |
|---|---|
| A | Retry Method 1 |
| B | Retry Method 2 |
| C | Retry Method 3 |
| D | Retry Method 4 |
| E | Retry Method 5 |
| . | . |
| . | . |
| . | . |

The special track 414 on the disk 91 in cartridge 411 stores a table which includes information about each cradle into which this particular cartridge 411 has been inserted. An example of this table is presented here as TABLE 3. The left column in TABLE 3 includes the serial number of each cradle into which this specific cartridge has previously been inserted. In the disclosed embodiment, the information in TABLE 3 is maintained by the cradles into which the cartridge 411 is inserted, rather than by the cartridge itself. However, some or all of the intelligence needed to maintain the table could alternatively be provided in the cartridge itself. If the cartridge is inserted into a cradle that it has never been used with before, the cradle will add a new row at the end of TABLE 3 stored within the track 414.

The rows in TABLE 3 have three columns. The left column is a list of the serial numbers of the cradles into which this particular cartridge has previously been inserted. The middle column is a count of the number of times the cartridge has been inserted into each respective cradle. The right column is a letter identifying one of the retry methods from TABLE 2 which, for this particular combination of cartridge and cradle, is considered to have a greater likelihood of success than other retry methods in the table. Thus, for example, the right entry in the first row of TABLE 3 is the letter "E", which is designating Retry Method 5 in TABLE 2. The manner in which the information in TABLE 3 is used and maintained will be discussed in more detail later.

TABLE 3

| Cradle Information | | |
|---|---|---|
| Cradle Serial Number | Insertion Count | Best Retry Method ID |
| 72AF | 27 | E |
| 9B22 | 3 | A |
| 63A5 | 62 | C |
| . | . | . |
| . | . | . |
| . | . | . |

The track 414 on the disk 91 stores a further table that contains calibration parameters, and an example of this table is presented here as TABLE 4. The first column in TABLE 4 contains a list of cradle serial numbers, and the second column contains a list of range identification codes that each identify a respective entry in TABLE 1. Each row in TABLE 4 corresponds to a respective combination of a cradle serial number and a temperature range, as set forth in the first two columns. Thus, it will be noted in TABLE 4 that the hypothetical serial number "72AF" appears twice in the table, the first time in association with temperature range T2 and the second time in association with temperature range T3. Each combination of a particular serial number and a particular temperature range is permitted to occur only once in TABLE 4. Thus, at most, a given serial number may occur five times in TABLE 4, because TABLE 1 of the disclosed embodiment identifies five possible temperature ranges.

The rows in TABLE 4 are added and maintained by the cradles into which the cartridge is inserted. Thus, if the ambient temperature has always been within range T2 when the cartridge has previously been used with a particular cradle, there will only be one entry in TABLE 4 for that particular cradle serial number, and it will identify temperature range T2. Alternatively, if prior operation of the cartridge with that particular cradle has involved some periods of time in temperature range T2 and also some periods of time in temperature range T3, then TABLE 4 of that cartridge will include two rows corresponding to that particular cradle, each row corresponding to a respective one of temperature ranges T2 and T3.

The third and fourth columns in TABLE 4 are respective calibration parameters, which in the disclosed embodiment are a demodulation offset and a servo gain. Although these are the particular parameters used in the disclosed embodiment, it will be recognized that it would be possible to use different parameters, and/or a larger or smaller number of parameters. For example, the calibration parameters can include servo information of the type shown in TABLE 4, and/or read channel information of a known type. The calibration parameters from the third and fourth columns of TABLE 4 are used by the cradle 812 to control movement of the arm 101 and the head 107 in the cartridge 411, for purposes of reading data from and writing data to the tracks on the disk 91, other than the special track 414. Different calibration parameters may work better for different cradles, and for different temperature ranges. This is why TABLE 4 stores a respective set of calibration parameters for each unique combination of a cradle serial number and a temperature range.

TABLE 4

| | Calibration Parameters | | |
|---|---|---|---|
| Cradle Serial Number | Temperature Range ID | Demodulation Offset | Servo Gain |
| 72AF | T2 | 24 | 16 |
| 72AF | T3 | 22 | 18 |
| 9B22 | T3 | 23 | 17 |
| . | . | . | . |
| . | . | . | . |
| . | . | . | . |

Figure 14:
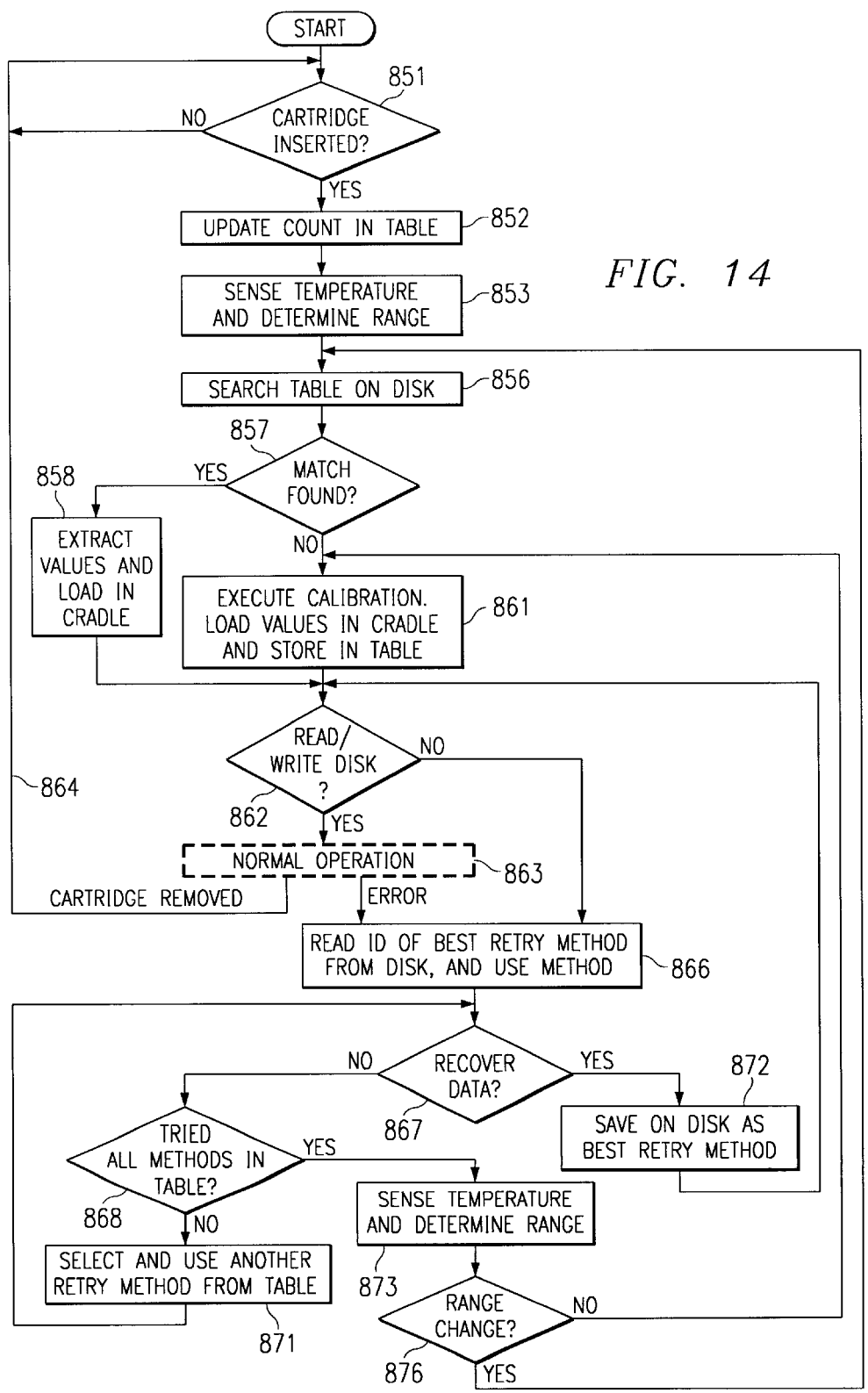
FIG. 14 is a flowchart showing a sequence of operations for the information storage device of FIG. 13.

FIG. 14 is a flowchart showing a sequence of operations carried out by the cradle 812 in order to properly operate with the cartridge 411, including use and maintenance of the TABLEs 3 and 4 stored in the track 414 on the disk 91. More specifically, when no cartridge is inserted, the cradle 812 waits at block 851, checking for insertion of a cartridge. When a cartridge 411 is inserted, control proceeds from block 851 to block 852, where the cradle accesses the track 414 of the disk 91 in the cartridge 411 in order to read the entry from TABLE 3 which corresponds to that cartridge, including the insertion count. The cradle then adds one to the insertion count and writes the updated insertion count back to the table on the disk 91. If the cradle finds that there is no entry for itself, which means that the particular cartridge has never previously been inserted into this particular cradle, the cradle adds a row to TABLE 3 on the disk 91, setting the insertion count to "1".

Control then proceeds to block 853, where the cradle uses a temperature sensor 819 to determine the ambient temperature. The cradle then identifies the temperature range in TABLE 1 which corresponds to this ambient temperature.

Control then proceeds to block 856 in FIG. 14, where the cradle again accesses the track 414 on disk 91, and reads the contents of TABLE 4. The cradle then searches this table for a row which includes both its own unique serial number and also the temperature range identification code corresponding to the temperature range identified at block 853. Then, at block 857, the cradle evaluates whether a match has been found. If a match was found, then controls proceeds to block 858, where the cradle extracts from that row of TABLE 4 the specified calibration parameters (such as demodulation offset and servo gain), and then configures itself to use those calibration parameters for accessing portions of the disk 91 other than the special track 414.

Alternatively, if it had been determined at block 857 that no match was found, or in other words that TABLE 4 did not include a row corresponding to this particular cradle and the current ambient temperature, control would have proceeded from block 857 to block 861. In block 861, the cradle executes a calibration procedure of a type which is known in the art, and which is therefore not illustrated and described here in detail. The calibration procedure determines, for this particular combination of cradle and cartridge, the optimum calibration parameters of the type stored in TABLE 4, such as demodulation offset and servo gain. The cradle then adds to TABLE 4 in track 414 of disk 91 a new row, which includes the cradle's own unique serial number, the temperature range identification code which was determined at block 853, and the calibration parameters which were determined by the calibration procedure. Further, the cradle configures itself to operate according to the calibration parameters determined in the calibration procedure.

From either block 858 or block 861, control proceeds to block 862, where the cradle 812 carries out a brief test to see if it can effect an error-free read and/or write to a portion of the disk 91 other than the track 414. If so, control proceeds to block 863, which corresponds to normal operation of the information storage device 810 of FIG. 13. Block 863 is shown as a broken line, because there are a number of operations and decisions which may be carried out during normal operation, but which are known in the art and do not need to be illustrated and described here in detail.

If the cartridge 411 is removed from the cradle 812 at some point during normal operation, control proceeds from block 863 back to block 851 in order to wait for reinsertion of that cartridge, or insertion of a different cartridge. Alternatively, if an error is detected with respect to reading data from or writing data to the disk 91 during normal operation in block 863, control proceeds from block 863 to block 866. Control can also arrive at block 866 directly from block 862, if it was determined at block 862 that errors were being encountered in attempting to access the disk 91.

In block 866, the cradle refers to its corresponding row in TABLE 3, and determines the code stored there to identify the best retry method for this particular cradle to use with the particular cartridge that has been inserted. It then utilizes this retry method to attempt to recover the data with respect to which the error was encountered. At block 867, the cradle evaluates whether this data has been recovered by the retry method. If not, then at block 868 the cradle checks to see whether it has tried all of the retry methods set forth in TABLE 2. If not, then at block 871 it selects and uses another retry method from TABLE 2, and then returns to block 867 to evaluate whether this alternative retry method was successful in recovering the data.

At some point, the cradle may determine at block 867 that the data has been successfully recovered. If so, then control proceeds from block 867 to block 872, where the cradle updates its corresponding row in TABLE 3 on the disk 91, in order to save the successful retry method as the best retry method to use in the future. From block 872, control returns to block 862.

Alternatively, if the cradle does not eventually determine at block 867 that the data has been recovered, it will eventually determine at block 868 that it has tried every one of the retry methods set forth in TABLE 2. In that event, control proceeds from block 868 to block 873, where the cradle uses the temperature sensor 819 to determine the current ambient temperature, and then uses TABLE 1 to identify the corresponding temperature range. This is because it is possible that the ambient temperature has changed to a temperature range different from the temperature range previously identified in block 853, which could cause errors. At block 876, the cradle evaluates whether or not the temperature range identified at block 873 is different from the temperature range which was previously identified at block 853. If not, control proceeds from block 876 to block 861, in order to determine new calibration parameters. Alternatively, if it is determined at block 876 that the temperature range has in fact changed, then control proceeds from block 876 back to block 856, where the cradle will search TABLE 4 again in order to determine whether TABLE 4 has an entry for this particular cradle and the new temperature range detected at block 873.

In the embodiment of FIGS. 13–14, as discussed above, if the cradle determines at block 857 that TABLE 4 does not contain an entry corresponding to itself and the current temperature range, it proceeds to block 861 and carries out a calibration procedure in order to determine appropriate calibration parameters. Alternatively, however, instead of carrying out the calibration procedure, the cradle could configure itself to use a set of predetermined default parameters, and then proceed to block 862. So long as no errors were encountered, the cradle would continue to operate using the default parameters. Consequently, the calibration procedure in block 861 would be carried out only if it was determined at block 876 that there had been a change in the temperature range.

The present invention provides a number of technical advantages. One such technical advantage is that, by saving respective sets of calibration parameters on the disk for various combinations of cradles and environmental conditions, fast initial startup is realized for the vast majority of cartridge insertions, by avoiding the time involved for the calibration process. A related advantage is that, even though faster startup is realized, very accurate operation is also realized, because the calibration parameters in use are customized for the particular combination of cradle, cartridge and environmental conditions.

A further advantage is that, by storing certain history information relating to cartridge use, such as a count of the number of times the cartridge has been inserted into each of various different cradles, an analysis regarding the use of the cartridge can be made in the event the cartridge is returned to its manufacturer. For example, the manufacturer could obtain a sense for whether the cartridge experienced a problem early in its lifetime, or after a long and useful life involving many insertions into many different cradles.

Still another advantage results from the capability to maintain for each combination of cartridge and cradle an identification of a retry method that has previously been used successfully for this combination. Consequently, in the event it becomes necessary to utilize a retry method, there is a good chance that the first method tried will have a high likelihood of success, thereby avoiding the time delays required to carry out a number of retry methods in an attempt to find one that will successfully recover data.

Although several exemplary embodiments have been illustrated and described in detail, it will be understood that various substitutions and alterations are possible without departing from the spirit and scope of the present invention, as defined by the following claims.

What is claimed is:

1. An apparatus comprising an information storage cartridge which includes:

a port;

an information storage medium having an information storage surface, said information storage surface storing information which includes control information, said control information including a plurality of control parameter sets which each correspond to a respective receiving unit into which said cartridge can be removably inserted; and structure operable to transfer information between said port and said storage medium, including a head electrically coupled to said port and operable to effect at least one of reading information from and writing information to said storage medium, said head and said storage medium being supported for relative movement in a manner causing said head to move relative to said surface while remaining adjacent thereto, wherein when said cartridge is removably inserted into a receiving unit said structure is operable to facilitate reading of said control information from said information storage surface using said head, and to thereafter facilitate relative movement of said head and said storage medium as a function of a current control parameter set that corresponds to a receiving unit into which said cartridge is currently inserted.

2. An apparatus according to claim 1, wherein said current control parameter set is a selected one of said control parameters sets stored on said storage medium.

3. An apparatus according to claim 1, wherein said current control parameter set is a control parameter set determined by a calibration procedure in a situation where said control information lacks a control parameter set that corresponds to a receiving unit into which said cartridge is currently inserted.

4. An apparatus according to claim 3, wherein said structure is operable to facilitate storage in said control information of said current control parameter set determined by said calibration procedure.

5. An apparatus according to claim 1, wherein each said control parameter set of said control information further corresponds to a respective one of a plurality of ranges of a predetermined environmental parameter.

6. An apparatus according to claim 5, wherein said environmental parameter is a temperature characteristic.

7. An apparatus according to claim 5, wherein said environmental parameter is a humidity characteristic.

8. An apparatus according to claim 5, wherein said environmental parameter is an ambient air pressure characteristic.

9. An apparatus according to claim 1, wherein said control information further includes a plurality of count values which respectively indicate the number of times that said cartridge has been inserted into respective receiving units that can removably receive said cartridge.

10. An apparatus according to claim 1, wherein said control information further includes a table associating with each of a plurality of receiving units that can removably receive said cartridge a selected one of a plurality of different retry methods, wherein each said retry method can be used to attempt to recover data from said storage medium in response to detection of an error.

11. A method of operating an information storage cartridge which includes a port and an information storage medium having an information storage surface, comprising the steps of:
storing on said storage surface information which includes control information, said control information including a plurality of control parameter sets which each correspond to a respective receiving unit into which said cartridge can be removably inserted;
supporting said storage medium and a head for relative movement in a manner causing said head to move relative to said surface while remaining adjacent thereto;
transferring information between said port and said storage medium, including use of said head to effect at least one of reading information from and writing information to said storage medium;
reading said control information from said information storage surface using said head;
selecting from said control information one of said control parameter sets which corresponds to a respective receiving unit into which said cartridge is currently inserted; and
thereafter effecting the relative movement of said head and said storage medium as a function of said selected control parameter set.

12. A method according to claim 11, further including the steps of:
responding to insertion of said cartridge into a receiving unit by determining whether one of said control parameters sets in said control information corresponds to the receiving unit in which said cartridges is removably inserted;
responding to a determination that said control information lacks a control parameter set for the receiving unit by carrying out a calibration procedure to determine a control parameter set which is then added to said control information; and
then carrying out said selecting step.

13. A method according to claim 11, including the step of configuring said control information so that each of said control parameter sets corresponds to a combination of a respective receiving unit and a respective range of a predetermined environmental parameter.

14. A method according to claim 13, including the step of selecting a temperature characteristic as said predetermined environmental parameter.

15. A method according to claim 13, including the step of selecting a humidity characteristic as said predetermined environmental parameter.

16. A method according to claim 13, including the step of selecting an ambient air pressure characteristic as said predetermined environmental parameter.

17. A method according to claim 11, including the step of including in said control information a plurality of count values which respectively indicate the number of times said cartridge has been inserted into respective receiving units that can removably receive said cartridge.

18. A method according to claim 11, including the step of providing within said control information a table associating with each of a plurality of receiving units that can removably receive said cartridge a selected one of a plurality of retry methods, wherein each said retry method can be used to attempt to recover data from said storage medium in response to detection of an error.

19. An apparatus comprising:
an information storage cartridge having information storage structure which stores selected information that includes control information, said control information including a plurality of control parameter sets which each correspond to a respective receiving unit into which said cartridge can be removably inserted, said information storage structure including an information storage medium with an information storage surface, at least a portion of said selected information being stored on said surface of said information storage medium.

20. An apparatus according to claim 19, including:
a head which, when said cartridge is removably inserted into a receiving unit, is movable relative to said surface of said information storage medium while remaining adjacent thereto; and
further structure which, when said cartridge is removably inserted into a receiving unit, is operable to facilitate reading of said control information from said information storage structure, and to thereafter facilitate relative movement of said head and said storage medium as a function of a current control parameter set that corresponds to a receiving unit into which said cartridge is currently inserted.

21. An apparatus according to claim 20,
wherein said control information is stored on said surface of said information storage medium; and
wherein said further structure facilitates use of said head to effect said reading of said control information.

22. An apparatus according to claim 20, wherein said current control parameter set is a selected one of said control parameters sets stored on said storage medium.

23. An apparatus according to claim 20, wherein said current control parameter set is a control parameter set determined by a calibration procedure in a situation where said control information lacks a control parameter set that corresponds to a receiving unit into which said cartridge is currently inserted.

24. An apparatus according to claim 23, wherein said further structure is operable to facilitate storage in said control information of said current control parameter set determined by said calibration procedure.

25. An apparatus according to claim 19, wherein each said control parameter set of said control information further corresponds to a respective one of a plurality of ranges of a predetermined environmental parameter.

26. An apparatus according to claim 25, wherein said environmental parameter is one of a temperature characteristic, a humidity characteristic, and an ambient air pressure characteristic.

27. An apparatus according to claim 19, wherein said control information further includes a plurality of count values which respectively indicate the number of times that said cartridge has been inserted into respective receiving units that can removably receive said cartridge.

28. An apparatus according to claim 19, wherein said control information further includes a table associating with each of a plurality of receiving units that can removably receive said cartridge a selected one of a plurality of different retry methods, wherein each said retry method can be used to attempt to recover data from said storage medium in response to detection of an error.

29. A method of operating an information storage cartridge which includes information storage structure having an information storage medium with an information storage surface, comprising:
storing in said information storage structure selected information which includes control information, said control information including a plurality of control parameter sets which each correspond to a respective receiving unit into which said cartridge can be removably inserted, at least a portion of said selected information being stored on said surface of said information storage medium.

30. A method according to claim 29, including:
causing a head to move relative to said surface of said information storage medium while remaining adjacent thereto when said cartridge is removably inserted into a receiving unit;
reading said control information from said information storage structure when said cartridge is removably inserted into a receiving unit; and
thereafter effecting relative movement of said head and said storage medium as a function of a current control parameter set that corresponds to a receiving unit into which said cartridge is currently inserted.

31. A method according to claim 30,
wherein said storing of said selected information includes storing said control information on said surface of said information storage medium; and
wherein said reading of said control information includes use of said head to read said control information from said surface.

32. A method according to claim 30, further including:
responding to insertion of said cartridge into a receiving unit by determining whether one of said control parameters sets in said control information corresponds to the receiving unit in which said cartridge is removably inserted;
responding to a determination that said control information includes a control parameter set for the receiving unit by selecting from said control information as said current control parameter set a control parameter set for the receiving unit.

33. A method according to claim 30, further including:
responding to insertion of said cartridge into a receiving unit by determining whether one of said control parameters sets in said control information corresponds to the receiving unit in which said cartridge is removably inserted;
responding to a determination that said control information lacks a control parameter set for the receiving unit by carrying out a calibration procedure to determine a control parameter set which is then added to said control information and used as said as said current control parameter set.

34. A method according to claim 29, including configuring said control information so that each of said control parameter sets corresponds to a combination of a respective receiving unit and a respective range of a predetermined environmental parameter.

35. A method according to claim 34, including selecting as said predetermined environmental parameter one of a temperature characteristic, a humidity characteristic, and an ambient air pressure characteristic.

36. A method according to claim 29, including providing within said control information a plurality of count values which respectively indicate the number of times said cartridge has been inserted into respective receiving units that can removably receive said cartridge.

37. A method according to claim 29, including providing within said control information a table associating with each of a plurality of receiving units that can removably receive said cartridge a selected one of a plurality of retry methods, wherein each said retry method can be used to attempt to recover data from said storage medium in response to detection of an error.

* * * * *